(12) United States Patent
Marin et al.

(10) Patent No.: US 7,470,759 B2
(45) Date of Patent: *Dec. 30, 2008

(54) ISOTACTIC-ATACTIC POLYPROPYLENE AND METHODS OF MAKING SAME

(75) Inventors: Vladimir Marin, Houston, TX (US); Abbas Razavi, Mons (BE)

(73) Assignee: Fina Technology, Inc., Houston, TX (US)

( * ) Notice: Subject to any disclaimer, the term of this patent is extended or adjusted under 35 U.S.C. 154(b) by 23 days.

This patent is subject to a terminal disclaimer.

(21) Appl. No.: 11/461,059

(22) Filed: Jul. 31, 2006

(65) Prior Publication Data

US 2008/0027193 A1 Jan. 31, 2008

(51) Int. Cl.
*C08F 4/72* (2006.01)
*C08F 4/64* (2006.01)
*C08F 4/52* (2006.01)
*C07F 17/00* (2006.01)

(52) U.S. Cl. .................. 526/170; 526/160; 526/943; 526/941; 526/901; 526/348; 526/351; 526/134; 502/103; 556/53

(58) Field of Classification Search .......... 526/160, 526/170, 943, 941; 556/53
See application file for complete search history.

(56) References Cited

U.S. PATENT DOCUMENTS

| | | |
|---|---|---|
| 4,271,060 A | 6/1981 | Hubby |
| 4,404,344 A | 9/1983 | Sinn et al. |
| 4,543,399 A | 9/1985 | Jenkins, III et al. |
| 4,588,790 A | 5/1986 | Jenkins, III et al. |
| 4,767,735 A | 8/1988 | Ewen et al. |
| 5,001,205 A | 3/1991 | Hoel |
| 5,028,670 A | 7/1991 | Chinh et al. |
| 5,155,080 A | 10/1992 | Elder et al. |
| 5,236,998 A | 8/1993 | Lundeen et al. |
| 5,317,036 A | 5/1994 | Brady, III et al. |
| 5,352,749 A | 10/1994 | DeChellis et al. |
| 5,405,922 A | 4/1995 | DeChellis et al. |
| 5,436,304 A | 7/1995 | Griffin et al. |
| 5,462,999 A | 10/1995 | Griffin et al. |
| 5,525,678 A | 6/1996 | Mink et al. |
| 5,589,555 A | 12/1996 | Zboril et al. |
| 5,616,661 A | 4/1997 | Eisinger et al. |
| 5,627,242 A | 5/1997 | Jacobsen et al. |
| 5,643,847 A | 7/1997 | Walzer, Jr. |
| 5,665,818 A | 9/1997 | Tilston et al. |
| 5,668,228 A | 9/1997 | Chinh et al. |
| 5,677,375 A | 10/1997 | Rifi et al. |
| 5,945,496 A | 8/1999 | Resconi et al. |
| 6,143,686 A | 11/2000 | Vizzini et al. |
| 6,147,173 A | 11/2000 | Holtcamp |
| 6,180,735 B1 | 1/2001 | Wenzel |
| 6,207,606 B1 | 3/2001 | Lue et al. |
| 6,211,105 B1 | 4/2001 | Holtcamp |
| 6,225,425 B1 | 5/2001 | Dolle et al. |
| 6,228,795 B1 | 5/2001 | Vizzini |
| 6,242,545 B1 | 6/2001 | Jejelowo et al. |
| 6,245,705 B1 | 6/2001 | Kissin |
| 6,245,868 B1 | 6/2001 | Agapiou et al. |
| 6,248,845 B1 | 6/2001 | Loveday et al. |

(Continued)

FOREIGN PATENT DOCUMENTS

WO WO 01/27124 A1 * 4/2001

OTHER PUBLICATIONS

Giardello, M.A.; Eisen, M.S.; Stern, C.L.; Marks, T.J. J. Am. Chem. Soc. 1995, 117, 12114-12129.*

(Continued)

*Primary Examiner*—Vasu Jagannathan
*Assistant Examiner*—Rip A. Lee
(74) *Attorney, Agent, or Firm*—Diane L. Kilpatrick-Lee

(57) ABSTRACT

A method of producing a polymer comprising contacting in a reaction zone under conditions suitable for polymerization of an alpha-olefin monomer with a metallocene catalyst having at least three asymmetric centers, and recovering an alpha-olefin polymer from the reaction zone. A method of polymerizing propylene comprising contacting in a reaction zone propylene, a cocatalyst, and a metallocene catalyst having the formula including stereoisomers:

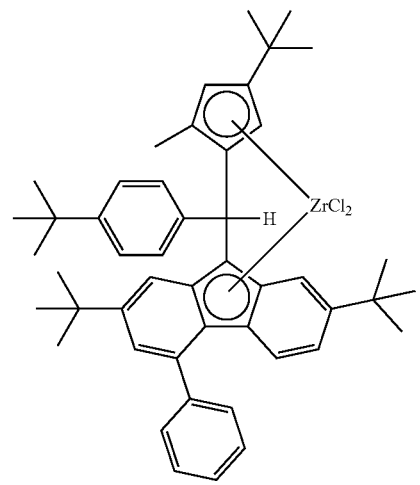

and recovering polypropylene from the reaction zone. A polypropylene composition having a tensile modulus from 40,000 psi to 300,000 psi, a tensile strength at yield from 2,000 psi to 6,000 psi, a tensile strength at break from 1,000 psi to 3,500 psi, a tensile strength from 1,000 psi to 5,000 Kpsi, an elongation at yield of greater than or equal to 10%, and an elongation at break from 50% to 500%.

17 Claims, 8 Drawing Sheets

U.S. PATENT DOCUMENTS

| | | | |
|---|---|---|---|
| 6,271,323 | B1 | 8/2001 | Loveday et al. |
| 6,274,684 | B1 | 8/2001 | Loveday et al. |
| 6,300,436 | B1 | 10/2001 | Agapiou et al. |
| 6,339,134 | B1 | 1/2002 | Crowther et al. |
| 6,340,730 | B1 | 1/2002 | Murray et al. |
| 6,346,586 | B1 | 2/2002 | Agapiou et al. |
| 6,359,072 | B1 | 3/2002 | Whaley |
| 6,362,298 | B2 | 3/2002 | Dolle et al. |
| 6,380,328 | B1 | 4/2002 | McConville et al. |
| 6,420,580 | B1 | 7/2002 | Holtcamp et al. |
| 6,683,150 | B1 | 1/2004 | Meverden et al. |
| 6,693,153 | B2 | 2/2004 | Miller et al. |
| 6,939,928 | B1 * | 9/2005 | Kawai et al. ............... 526/160 |
| 7,034,157 | B2 | 4/2006 | Razavi et al. |
| 7,094,938 | B1 | 8/2006 | Marin et al. |
| 2005/0148460 | A1 * | 7/2005 | Marin et al. ............... 502/152 |

OTHER PUBLICATIONS

Fan, W., et al., "Alternating Stereospecific Copolymerization of Ethylene and Propylene with Metallocene Catalysts," J. Am. Chem. Soc., vol. 123, 2001, American Chemical Society, pp. 9555-9563.

Hlatky, Gregory G., "Heterogeneous Single Site Catalysts for Olefin Polymerization," Chemical Reviews, vol. 100, 2000, American Chemical Society, pp. 1347-1376.

Jin, Jizhu, et al., "Alternating copolymerization of ethylene and propene with the [ethylene(1-indenyl) (9-fluorenyl)]zirconium dichloride-methylaluminoxane catalyst system," Macromol. Rapid Commun., vol. 19, 1998, Hüthig & Wepf Verlag, Zug, pp. 337-339.

Leclerc, Margarete K., et al., "Alternating Ethene/Propene Copolymerization with a Metallocene Catalyst**," Angew. Chem. Int. Ed., vol. 37, No. 7, 1998, Wiley-VCH Verlag GmbH, D-69451 Weinheim, pp. 922-925.

Miller, Stephen A., et al., "Isotactic-Hemiisotactic Polypropylene from C1-Symmetric ansa-Metallocene Catalysts: A New Strategy for the Synthesis of Elastomeric Polypropylene," Organometallics, vol. 21, 2002, American Chemical Society, pp. 934-945.

PoLyInfo Help, http://polymer.nims.go.jp/top/what_is_polyinfo-e.html, 2006, 6 pages.

Rieger, Bernhard, et al., "Unsymmetric ansa-Zirconocene Complexes with Chiral Ethylene Bridges: Influence of Bridge Conformation and Monomar Concentration on the Stereoselectivity of the Propene Polymerization Reaction," Organometallics, vol. 13, 1994, American Chemical Society, pp. 647-653.

U.S. Appl. No. 11/305,704, filed on Dec. 16, 2005, entitled "Catalyst Compositions and Methods of Forming Isotactic Polypropylene."

U.S. Appl. No. 11/205,934, filed on Aug. 17, 2005, entitled "Preparation and Use of Tetrasubstituted Fluorenyl Catalysts for Polymerization of Olefins."

* cited by examiner

ISOTACTIC-ATACTIC POLYPROPYLENE AND METHODS OF MAKING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Technical Field

This disclosure relates to catalyst systems for olefin polymerization. More specifically, this disclosure relates to metallocene catalyst systems and polymers produced there from.

2. Background

Olefin polymers and copolymers such as polyethylene, polypropylene and ethylene-propylene can be produced under various polymerization conditions and employing various polymerization catalysts. In the case of $C_3$ or greater alpha olefins, the resulting polymer may exhibit stereoregularity. For example, in the case of propylene, a polypropylene product may be isotactic wherein each methyl group attached to the tertiary carbon atoms of the successive monomeric unit falls on the same side of a hypothetical plane through the main chain of the polymer. Polypropylene may also be syndiotactic wherein the methyl groups attached to the tertiary carbon atoms of the successive monomeric unit are arranged as racemic dyads. In other words, the methyl groups in isotactic polypropylene lie on the same side of the polymer backbone whereas in syndiotactic polypropylene the methyl groups lie on alternate sides of the polymer backbone. In the absence of any regular arrangement of the methyl groups with respect to the polymer backbone the polymer is atactic. The stereoregularity of the polymeric product impacts both the physical and mechanical properties of said product.

Fluorenyl-type metallocene catalysts are effective catalysts in the polymerization of olefin polymers such as ethylene, propylene and higher olefins or other ethylenically unsaturated monomers into homopolymers or copolymers. Fluorenyl-type metallocenes are generally characterized by bridged cyclopentadienyl and fluorenyl groups that serve as a ligand to a metal atom. Varying the substituents or position of substituents on the fluorenyl group, cyclopentadienyl group or bridging moiety of a given fluorenyl-type metallocene catalyst may produce polymers having very different physical properties. For example, an isomer of a fluorenyl-type metallocene catalyst may produce isotactic polypropylene, while another isomer of the same catalyst may produce syndiotactic polypropylene. In addition, properties such as the molecular weight and melting points of the polypropylene composition may vary and as a result the mechanical properties and utility of the polymer may vary.

Thus, there is an ongoing need for catalysts capable of producing stereoregular polypropylene compositions with differing physical properties such as molecular weight and melting points.

BRIEF SUMMARY

Disclosed herein is a method of producing a polymer comprising contacting in a reaction zone under conditions suitable for polymerization of an alpha-olefin monomer with a metallocene catalyst having at least three asymmetric centers, and recovering an alpha-olefin polymer from the reaction zone.

Further disclosed herein is a method of polymerizing propylene comprising contacting in a reaction zone propylene, a cocatalyst, and a metallocene catalyst having the formula including stereoisomers:

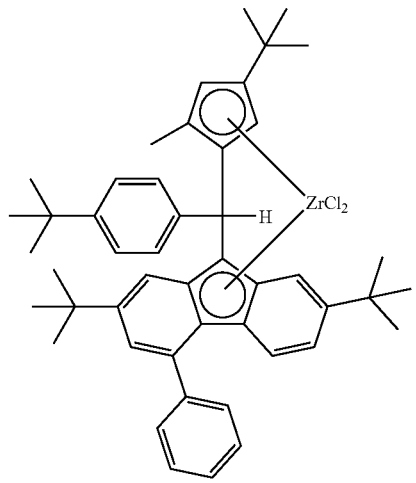

and recovering polypropylene from the reaction zone.

Also disclosed herein is a polypropylene composition having a tensile modulus from 40,000 psi to 300,000 psi, a tensile strength at yield from 2,000 psi to 6,000 psi, a tensile strength at break from 1,000 psi to 3,500 psi, a tensile strength from 1,000 psi to 5,000 Kpsi, an elongation at yield of greater than or equal to 10%, and an elongation at break from 50% to 500%.

The foregoing has outlined rather broadly the features and technical advantages of the present disclosure in order that the detailed description of the embodiments that follow may be better understood. Additional features and advantages of the embodiments will be described hereinafter that form the subject of the claims of the disclosure. It should be appreciated by those skilled in the art that the conception and the specific embodiments disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims.

DETAILED DESCRIPTION

Figure 1:
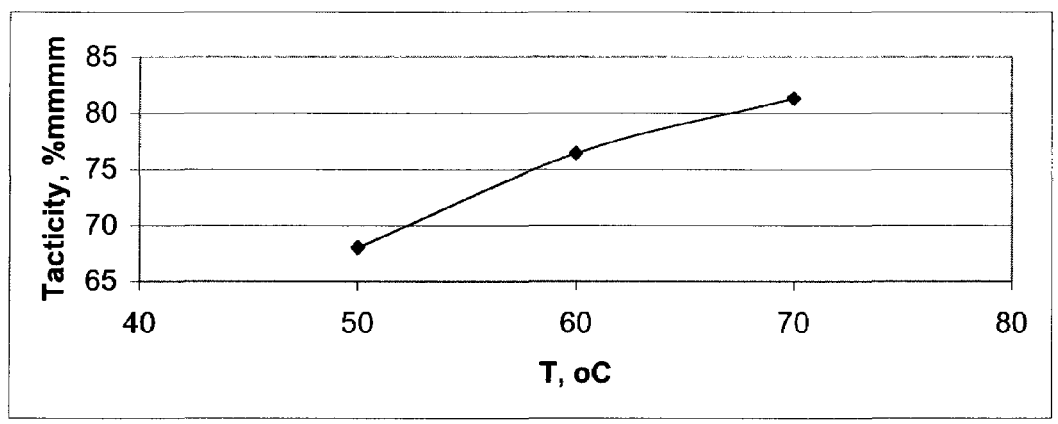
FIG. 1 is a plot of the reaction temperature versus tacticity for polymers produced using the VM435-3 catalyst.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

The term "activity" generally refers to the weight of product produced per weight of the catalyst used in a process per hour of reaction at a standard set of conditions (e.g., grams product/gram catalyst/hr).

The term "substituted" refers to an atom, radical or group replacing hydrogen in a chemical compound.

The term "homogenous polymerization" refers to polymerization via contact with a catalyst that is present within the reaction system in the same phase as the reactants (e.g., a catalyst in solution within a liquid phase reaction).

The term "tacticity" refers to the arrangement of pendant groups in a polymer. For example, a polymer is "atactic" when its pendant groups are arranged in a random fashion on both sides of the chain of the polymer. In contrast, a polymer is "isotactic" when all of its pendant groups are arranged on the same side of the chain and "syndiotactic" when its pendant groups alternate on opposite sides of the chain.

As used herein, "isotacticity" is measured via $^{13}$C NMR spectroscopy using meso pentads and is expressed as the percentage of meso pentads (% mmmm). As used herein, the term "meso pentads" refers to successive methyl groups located on the same side of the polymer chain.

As used herein, "molecular weight distribution" is the ratio of the weight average molecular weight to the number average molecular weight (Mw/Mn) of a polymer and may also be referred to as the polydispersity index.

As used herein, "melting temperature" is measured by differential scanning calorimetry using a modified version of ASTM D 3418-99. Specifically, for a sample weighing between 5 and 10 g, the following standard test conditions involved heating the sample from 50° C. to 210° C. to erase the thermal history of the sample, followed by holding the sample at 210° C. for 5 minutes. The sample is then cooled to 50° C. to induce recrystallization and subsequently subjected to a second melt in the temperature range 50° C. to 190° C. For each of these temperature changes, the temperature is ramped at a rate of 10° C./min.

Disclosed herein are catalysts and catalyst systems for the polymerization of olefins. A catalyst system herein refers to one or more chemical agents, which operate in concert to increase the rate of a reaction. Said catalyst system may comprise a metallocene catalyst. Metallocene catalysts may be characterized generally as coordination compounds incorporating one or more cyclopentadienyl (Cp) groups (which may be substituted or unsubstituted, each substitution being the same or different) coordinated with a transition metal through π bonding.

In an embodiment, a catalyst for use in olefin polymerization comprises at least one cyclopentadienyl ligand, at least one fluorenyl ligand, at least one bridging ligand and at least one metal. These catalysts are collectively referred to herein as fluorenyl metallocene catalysts (FMC). Each of the components of the FMCs will be described in more detail herein.

In an embodiment, the FMCs of this disclosure comprise at least three asymmetric centers. The FMCs may be used in conjunction with one or more cocatalysts to produce a catalyst system that effects the polymerization of olefins such as alpha olefins to produce homopolymers or copolymers of said olefins. The disclosed catalysts may be employed in the production of polymer products having varying degrees of stereoregularity such as isotactic-atactic polypropylene.

In an embodiment, a FMC for the polymerization of olefins may be represented by the general formula:

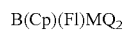

where M is a metal, Q may be a halogen, an alkyl group, an aryl group, or combinations thereof; Cp is a cyclopentadienyl group; Fl is a fluorenyl group, and B is a structural bridge between Cp and Fl imparting stereorigidity to said catalyst. In some embodiments B, Q, Fl or any combination thereof may be substituted. In an embodiment, Cp, Fl and B are chosen such that the FMC has at least three asymmetric centers. Herein an asymmetric center is given the broadest definition known to one of ordinary skill in the art wherein an asymmetric center is an atom in a molecule that causes chirality, usually an atom that is bound to four different groups. In an embodiment, the FMC comprises at least three asymmetric carbons. In another embodiment, B, Cp, and Fl each comprise at least one asymmetric carbon.

In an embodiment, a FMC for the polymerization of olefins comprises a cyclopentadienyl group (Cp). In an embodiment, the Cp group is substituted. In embodiments wherein the Cp group is substituted, the Cp group may have any number and/or placement of substituent groups capable of producing the desired polymer product. Unless otherwise specified, the substituents on the Cp may comprise an aliphatic group, an aromatic group, a cyclic group, any combination thereof or any substituted derivative thereof, including but not limited to, a halide, an alkoxide, or an amide-substituted derivative thereof; any one of which has from 1 to 20 carbon atoms; or hydrogen. Examples of aliphatic groups, in each instance, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs, combinations thereof or derivatives thereof, in each instance having from 1 to 20 carbon atoms. Thus, aliphatic groups include, but are not limited to, hydrocarbyls such as paraffins and alkenyls. Cp substituent groups may be the same or different and may include hydrogen radicals; alkyls such as for example methyl, ethyl, propyl, butyl, tert-butyl, pentyl, hexyl, fluoromethyl, fluoroethyl, difluroethyl, iodopropyl, bromohexyl, benzyl, phenyl, methylphenyl, tert-butylphenyl, chlorobenzyl, dimethylphosphine and methylphenylphosphine; alkenyls for example 3-butenyl, 2-propenyl and 5-hexenyl; alkynyls; cycloalkyls for example cyclopentyl and cyclohexyl; aryls for example trimethylsilyl, trimethylgermyl, methyldiethylsilyl, acyls, aroyls, tris(trifluoromethyl)silyl, methylbis(difluoromethyl)silyl and bromomethyldimethylgeimyl; alkoxys for example methoxy, ethoxy, propoxy and phenoxy; aryloxys; alkylthiols; dialkylamines for example dimethylamine and diphenylamine; alkylamidos; alkoxycarbonyls; aryloxycarbonyls; carbomoyls; alkyl- and dialkyl-carbamoyls; acyloxys; acylaminos; aroylaminos; organometalloid radicals for example dimethylboron; Group 15 and Group 16 radicals for example methylsulfide and ethylsulfide; and combinations thereof. The Cp group may be asymmetrically substituted. In a specific embodiment, the Cp group is mono-substituted in the 3 position with a tert-butyl group. In such an embodiment, the Cp group may or may not have further substitution. Alternatively, the Cp group is substituted at the 3 position with a tert-butyl group and at the 5 position with a methyl group. In such an embodiment, the Cp group may or may not have further substitution.

In an embodiment, a FMC for the polymerization of olefins comprises a fluorenyl group (Fl). Fluorenyl groups may be characterized by the chemical formula and numbering scheme indicated in Formula (I):

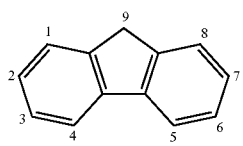

In this numbering scheme, 9 indicates the bridgehead carbon atom. The remaining carbon atoms available to accept substituents are indicated by numbers 1-4 on one phenyl group of the ligand, and numbers 5-8 on the other phenyl group of the fluorenyl ligand.

In an embodiment, the Fl group is substituted. In embodiments wherein the Fl group is substituted, the Fl group may have any number and/or placement of substituent groups capable of producing the desired polymer product. Unless otherwise specified, the substituents on the Fl may comprise an aliphatic group; an aromatic group; a cyclic group; any combination thereof, any substituted derivative thereof, including but not limited to, a halide, an alkoxide, or an amide-substituted derivative thereof; any one of which has from 1 to 20 carbon atoms; or hydrogen. Examples of aliphatic groups, in each instance, include, but are not limited to, an alkyl group, a cycloalkyl group, an alkenyl group, a cycloalkenyl group, an alkynyl group, an alkadienyl group, a cyclic group, and includes all substituted, unsubstituted, branched, and linear analogs or derivatives thereof, or combinations thereof in each instance having from one to 20 carbon atoms. Thus, aliphatic groups include, but are not limited to, hydrocarbyls such as paraffins and alkenyls. Fl substituent groups may be the same or different and may include hydrogen radicals; alkyls for example methyl, ethyl, propyl, butyl, tert-butyl, pentyl, hexyl, fluoromethyl, fluoroethyl, difluoroethyl, iodopropyl, bromohexyl, benzyl, phenyl, methylphenyl, tert-butylphenyl, chlorobenzyl, dimethylphosphine and methylphenylphosphine; alkenyls for example 3-butenyl, 2-propenyl and 5-hexenyl; alkynyls; cycloalkyls for example cyclopentyl and cyclohexyl; aryls for example trimethylsilyl, trimethylgermyl, methyldiethylsilyl; acyls; aroyls for example tris(trifluoromethyl)silyl, methylbis(difluoromethyl)silyl and bromomethyldimethylgermyl; alkoxys for example methoxy, ethoxy, propoxy and phenoxy; aryloxys; alkylthiols; dialkylamines for example dimethylamine and diphenylamine; alkylamidos; alkoxycarbonyls; aryloxycarbonyls; carbomoyls; alkyl- and dialkyl-carbamoyls; acyloxys; acylaminos; aroylaminos; organometalloid radicals for example dimethylboron; Group 15 and Group 16 radicals for example methylsulfide and ethylsulfide; and combinations thereof.

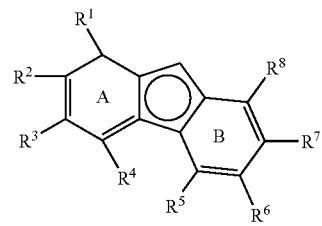

In an embodiment, the Fl group is asymmetrically substituted. For example, the Fl group may be numbered as shown in structure II where each phenyl group is designated as either phenyl group A or phenyl group B. In such embodiments, $R^1$—$R^8$ may each comprise a hydrogen, a $C_1$-$C_{20}$ alkyl group, a $C_6$-$C_{30}$ aryl group, a $C_7$-$C_{30}$ alkyl aryl group, a $C_1$-$C_{20}$ alkoxy group, a $C_7$-$C_{30}$ aryloxy group, a $C_1$-$C_{20}$ amido group or any combination thereof. In an embodiment, the Fl group comprises multiple substituents. In such embodiments, at least one substitutent on phenyl ring A of the Fl group differs from the substituent in the identical position on phenyl group B. For example, $R^1$ may be different from $R^8$, alternatively $R^2$ may be different from $R^7$, alternatively $R^3$ may be different from $R^6$, alternatively $R^4$ may be different from $R^5$ and, alternatively any combination of these substituents may be employed. In one embodiment, the Fl group may be substituted in positions 2, 4 and 7.

In an embodiment, a catalyst for the polymerization of olefins comprises a ligand (Y) which may be represented by chemical formula (III) below:

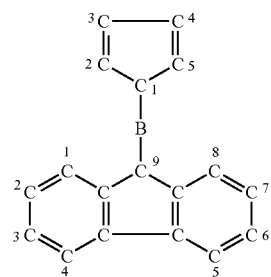

wherein a Cp group and a Fl group are structurally linked through a bridging group (B). In an embodiment B may be characterized by the general formula:

where E may comprise carbon or silicon, $R^1$, $R^2$ or both may comprise a hydrogen, a $C_1$-$C_{20}$ alkyl group, a $C_6$-$C_{30}$ aryl group, a $C_7$-$C_{30}$ alkyl aryl group, a $C_1$-$C_{20}$ alkoxy group, a $C_7$-$C_{30}$ aryloxy group, a $C_1$-$C_{20}$ amido group or any combination thereof. In an embodiment, E is asymmetrically substituted and $R^1$ is different from $R^2$.

In an embodiment, a ligand for use in the FMCs of this disclosure comprises an asymmetrically substituted Cp group, an asymmetrically substituted Fl group and an asymmetrically substituted bridging group. Such ligands may be used to form an FMC comprising at least three asymmetric centers.

In an embodiment, a FMC for the polymerization of olefins comprises a metal (M). The metal atom "M" of the FMC, as described throughout the specification and claims, may comprise atoms of Groups 3 through 12 and lanthanide Group atoms, alternatively atoms of Groups 3 through 10, alternatively Sc, Ti, Zr, Hf, V, Nb, Ta, Mn, Re, Fe, Ru, Os, Co, Rh, Ir or Ni. Alternatively M comprises zirconium.

The oxidation state of the metal atom "M" may range from 0 to +7 or is +1, +2, +3, +4 or +5, for example. The groups bound to the metal atom "M" have been designated herein as Q and are present in a number such that the compounds described herein are electrically neutral, unless otherwise indicated. In an embodiment, Q comprises an alkyl group, an aryl group, a halide, or combinations thereof Alternatively Q comprises a halide.

In an embodiment, a catalyst system for the polymerization of olefins comprises an FMC comprising at least three asymmetric centers. The FMC may comprise an asymmetrically substituted Cp group, an asymmetrically substituted Fl group, an asymmetrically substituted bridging group and a metal. Examples of FMCs comprising at least three asymmetric centers are shown in formulas IV-VIII.

In an embodiment, the Cp group, Fl group, bridging group and metal may be of the type disclosed herein and may form a complex represented by the general chemical formula (IV):

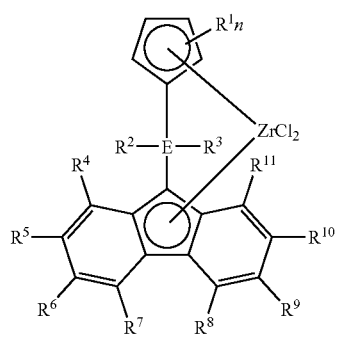

(IV)

wherein E comprises C or Si, $R^1$—$R^{11}$ comprises a hydrogen, a $C_1$-$C_{20}$ alkyl group, a $C_6$-$C_{30}$ aryl group, a $C_7$-$C_{30}$ alkylaryl group, a $C_1$-$C_{20}$ alkoxy group, a $C_7$-$C_{30}$ aryloxy, a $C_1$-$C_{20}$ amido-group, or combinations thereof and n=1 to 4; $R^2$ is different from $R^3$, and at least one of the following conditions is realized: $R^4$ is different from $R^{11}$, $R^5$ is different from $R^{10}$, $R^6$ is different from $R^9$ or, $R^7$ is different from $R^8$. Alternatively, a catalyst for the polymerization of olefins comprises an FMC of the type characterized by the general chemical formula V:

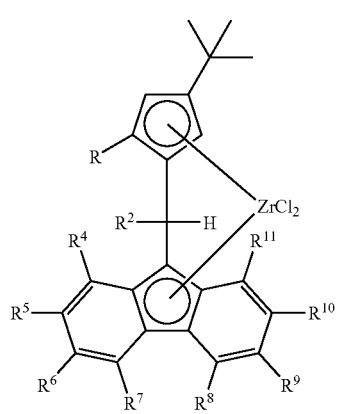

(V)

wherein R comprise H or Me, $R^2$ comprises a $C_1$-$C_{20}$ alkyl group, a $C_6$-$C_{30}$ aryl group or combinations thereof and $R^4$—$R^{11}$ comprises a hydrogen, $C_1$-$C_{20}$ alkyl group, a $C_6$-$C_{30}$ aryl group, or combinations thereof and at least one of the following conditions is realized: $R^4$ is different from $R^{11}$, $R^5$ is different from $R^{10}$, $R^6$ is different from $R^9$ or, $R^7$ is different from $R^8$. Alternatively, a catalyst for the polymerization of olefins comprises an FMC of the type characterized by the general chemical formula VI:

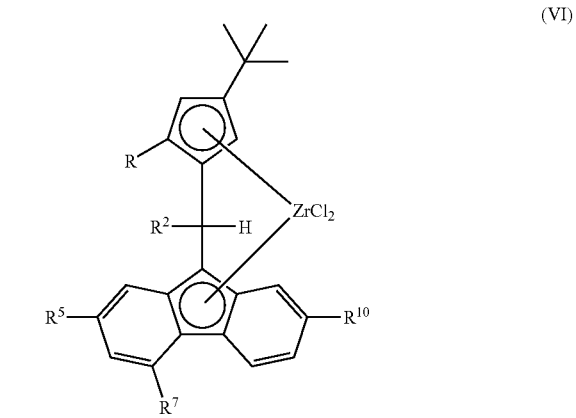

(VI)

wherein R comprise H, Me; $R^2$, $R^5$, $R^7$ or, $R^{10}$ each may comprise a $C_1$-$C_{20}$ alkyl group, a $C_6$-$C_{30}$ aryl group or combinations thereof and $R^5$ and $R^{10}$ are the same or different. Such FMCs may exist as stereoisomers and each stereoisomer may function as a catalyst for the polymerization of olefins of the type disclosed herein. Alternatively, a catalyst for the polymerization of olefins comprises an FMC of the type characterized by the general chemical formula VII:

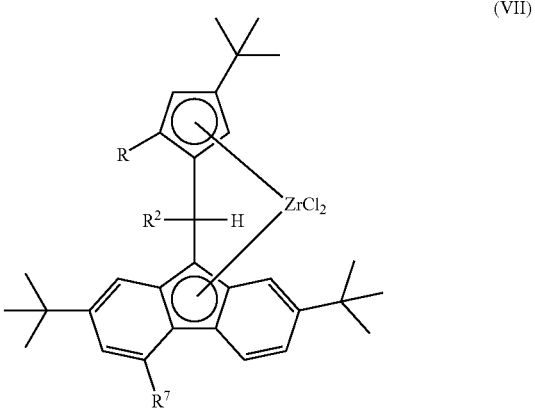

(VII)

wherein R comprise H, Me; $R^2$ and $R^7$ comprises a $C_6$-$C_{30}$ aryl group. Such FMCs may exist as stereoisomers and each stereoisomer may function as a catalyst for the polymerization of olefins of the type disclosed herein.

In an embodiment a FMC for the polymerization of olefins may be a zirconium metallocene complex represented by chemical formula VIII:

(VIII)

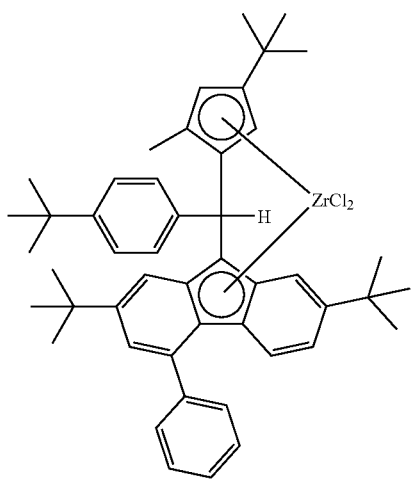

The FMCs of this disclosure may be supported or unsupported. Typical support materials may include talc, inorganic oxides, clays and clay minerals, ion-exchanged layered compounds, diatomaceous earth compounds, zeolites or a resinous support material, such as a polyolefin, for example.

Specific inorganic oxides include without limitation silica, alumina, magnesia, titania and zirconia, for example. The inorganic oxides used as support materials may have an average particle size of from 30 microns to 600 microns or from 30 microns to 100 microns, a surface area of from 50 m$^2$/g to 1,000 m$^2$/g or from 100 m$^2$/g to 400 m$^2$/g and a pore volume of from 0.5 cc/g to 3.5 cc/g or from 0.5 cc/g to 2 cc/g, for example.

Methods for supporting metallocene catalysts are generally known in the art and such methods are disclosed in U.S. Pat. Nos. 5,643,847, 6,143,686 and 6,228,795, each of which are incorporated by reference herein.

In an embodiment, the synthesis of catalysts of the type disclosed herein may be carried out by any means known to one of ordinary skill in the art. Alternatively, the catalysts may be synthesized according to a methodology comprising fulvene preparation, bridging ligand preparation and metallation. The process for the preparation of a polymerization catalyst of the type disclosed herein can be exemplified by the preparation of the FMC (1-naphthyl)[(3-Butyl-5-methyl-cyclopentadienyl)(3,6-di-tert-butyl-fluorenyl)]methane zirconium dichloride using the three step process.

In the first reaction, RXN1, preparation of a fulvene was accomplished by the reaction of methyl-tert-butyl-cyclopentadiene with 4-t-butyl-benzaldehyde in the presence of the base sodium methoxide.

RXN 1

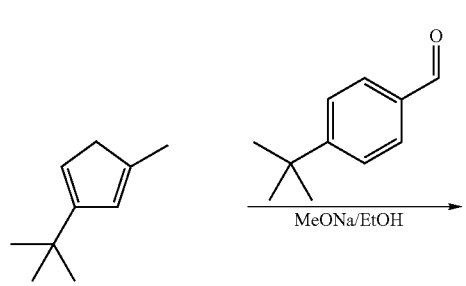

Addition of the bridging ligand was accomplished by reaction of the lithium salt of 2,7-di-tert-butyl-4-phenyl-fluorene with 6-(4-tert-butyl-Phenyl)-5-methyl-3-tert-butyl-fulvene in ether solution, RXN 2. Specifically, treatment of the fluorenyl group with butyllithium results in an intermediate wherein the Li is substituted at position 9 of the fluorenyl group which then reacts further to substitute the fulvene at that position and form the bridged ligand.

RXN 2

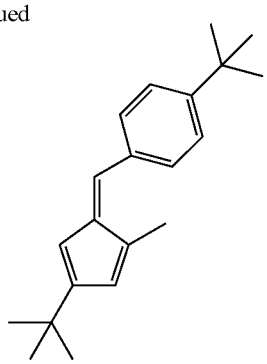

Finally, the complex is metallated by double deprotonation of the ligand with 2 equivalents of n-butyllithium in ether and subsequent reaction of the dilithium salt with $ZrCl_4$ in toluene affording the FMC. It is to be understood that reactions described herein for the synthesis of FMC catalysts having three asymmetric centers are exemplary only and other reagents and reaction conditions may be employed by one of ordinary skill in the art to produce catalysts of the type disclosed herein.

In an embodiment, a catalyst system for the polymerization of olefins comprises a cocatalyst. In employing the catalyst components of the present disclosure (i.e. FMCs) in polymerization procedures, they may be used in conjunction with an activating co-catalyst. Suitable activating co-catalysts may take the form of co-catalysts such as are commonly employed in metallocene-catalyzed polymerization reactions. Thus, the activating co-catalyst may take the form of an aluminum co-catalyst such as for example and without limitation alumoxane co-catalysts. Alumoxane co-catalysts are also referred to as aluminoxane or polyhydrocarbyl aluminum oxides. Such compounds include oligomeric or polymeric compounds having repeating units as indicated by the chemical formula shown in Formula IX:

(IX)

where R is an alkyl group comprising from 1 to 5 carbon atoms.

Alumoxanes are well known in the art and are generally prepared by reacting an organo-aluminum compound with water, although other synthetic routes are known to those skilled in the art. Alumoxanes may be either linear polymers or they may be cyclic, as disclosed for example in U.S. Pat. No. 4,404,344. Thus, alumoxane is an oligomeric or polymeric aluminum oxy compound containing chains of alternating aluminum and oxygen atoms whereby the aluminum carries a substituent, such as an alkyl group. The structure of linear and cyclic alumoxanes is generally believed to be represented by the general formula —(Al(R)—O)$_m$ for a cyclic alumoxane, and $R_2Al$—O—(Al(R)—O)$_m$—$AlR_2$ for a linear compound wherein each R may independently comprise a $C_1$-$C_{10}$ hydrocarbyl, alternatively an alkyl group or halide and m is an integer ranging from 1 to 50, alternatively from 1 to 10, alternatively m is 4. Alumoxanes also exist in the configuration of cage or cluster compounds.

Alumoxanes are typically the reaction products of water and an aluminum alkyl, which in addition to an alkyl group may contain halide or alkoxide groups. Reacting several different aluminum alkyl compounds, such as, for example, trimethylaluminum and tri-isobutylaluminum, with water yields so-called modified or mixed alumoxanes. Examples of alumoxanes suitable for use in this disclosure include without limitation methylalumoxane and methylalumoxane modified with minor amounts of other higher alkyl groups such as isobutyl. Alumoxanes generally contain minor to substantial amounts of the starting aluminum alkyl compounds. In an embodiment, the co-catalyst comprises poly (methylaluminum oxide), which may be prepared either from trimethylaluminum or tri-isobutylaluminum. Poly (methylaluminum oxide) may also be referred to as poly (isobutylaluminum oxide).

The alkyl alumoxane co-catalyst and transition FMC are employed in any suitable amount to provide an olefin polymerization catalyst. Suitable aluminum: FMC mole ratios are within the range of 10:1 to 20,000:1 alternatively, within the range of 50:1 to 10,000:1 alternatively, within the range of 100:1 to 5,000:1. Normally, the FMC component and the alumoxane, or other activating co-catalyst as described herein, are mixed prior to introduction in the polymerization reactor in a mode of operation such as described in U.S. Pat. No. 4,767,735, which is incorporated by reference herein in its entirety. In addition, other activating co-catalysts which are suitable for use in the present disclosure include those catalysts which are supported on fluorinated silica supports. Such catalysts may contain MAO, alternatively such catalysts may not contain MAO.

Other suitable activating co-catalysts which can be used include without limitation those catalysts which function to form a catalyst cation with an anion comprising one or more boron atoms. By way of example, the activating co-catalyst may take the form of triphenylcarbenium tetrakispentafluorophenyl) boronate as disclosed in U.S. Pat. No. 5,155,080. As described there, the activating co-catalyst produces an anion which functions as a stabilizing anion in a transition metal catalyst system. Suitable noncoordinating anions include $[W(PhF_5)]^-$, $[Mo(PhF_5)]^-$ (wherein $PhF_5$ is pentafluorophenyl), $[ClO_4]^-$, $[S_2O_6]^-$, $[PF_6]^-$, $[SbR_6]^-$, and/or $[AlR_4]^-$ wherein each R is independently $C_1$, a $C_1$-$C_5$ alkyl group such as a methyl group; an aryl group such as a phenyl or substituted phenyl group; a fluorinated aryl group; or combinations thereof. For a further description of such activating co-catalysts, reference is made to the aforementioned U.S. Pat. No. 5,155,080, the entire disclosure of which is incorporated herein by reference.

In addition to the use of an activating co-catalyst, the polymerization reaction may be carried out in the presence of a scavenging agent or polymerization co-catalyst which is added to the polymerization reactor along with the catalyst component and activating co-catalyst. These scavengers can be generally characterized as organometallic compounds of metals of Groups 1A, 2A, and 3B of the Periodic Table of Elements. As a practical matter, organoaluminum compounds are normally used as co-catalysts in polymerization reactions. Specific examples include triethylaluminum, tri-isobutylaluminum, diethylaluminum chloride, diethylaluminum hydride and the like. Scavenging co-catalysts normally employed in the reactions of this disclosure include methylalumoxane (MAO), triethylaluminum (TEAL), tri-isobutylaluminum (TIBAL) or combinations thereof.

The activators may or may not be associated with or bound to a support, either in association with the catalyst (e.g, FMC) or separate from the catalyst component, such as described by Gregory G. Hlatky, Heterogeneous Single-Site Catalysts for Olefin Polymerization 100(4) Chemical Reviews 1347-1374 (2000).

As indicated elsewhere herein, catalyst systems comprising an FMC of the type disclosed herein may be used to catalyze the polymerization of alpha olefins. Once the catalyst system is prepared, as described above and/or as known to one skilled in the art, a variety of processes may be carried out using the catalyst system. The equipment, process conditions, reactants, additives and other materials used in polymerization processes will vary in a given process, depending on the desired composition and properties of the polymer being formed.

In certain embodiments, the processes described above generally include polymerizing olefin monomers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene) for example. Other monomers include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

The olefin polymerization may be carried out using solution phase, gas phase, slurry phase, bulk phase, high pressure processes or combinations thereof, for example. A detailed description of these processes is given in U.S. Pat. Nos. 5,525,678, 6,420,580, 6,380,328, 6,359,072, 6,346,586, 6,340,730, 6,339,134, 6,300,436, 6,274,684, 6,271,323, 6,248,845, 6,245,868, 6,245,705, 6,242,545, 6,211,105, 6,207,606, 6,180,735 and 6,147,173, which are incorporated by reference herein. Examples of solution processes are described in U.S. Pat. Nos. 4,271,060, 5,001,205, 5,236,998 and 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from 100 psig to 500 psig, or from 200 psig to 400 psig or from 250 psig to 350 psig, for example. The reactor temperature in a gas phase process may vary from −30° C to 120° C., or from 60° C. to 115° C., or from 70° C. to 110° C. or from 70° C. to 95° C., for example. A more detailed description of gas phase polymerization processes is given in U.S. Pat. Nos. 4,543,399, 4,588,790, 5,028,670, 5,317,036, 5,352,749, 5,405,922, 5,436,304, 5,456,471, 5,462,999, 5,616,661, 5,627,242, 5,665,818, 5,677,375 and 5,668,228, which are incorporated by reference herein. In an embodiment, a FMC of the type disclosed herein produces a polypropylene product having a molecular weight in the range of 100,000 to 2,000,000 Daltons at a reaction temperature of from 50° C. to 70° C.

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process. However, a process may be a bulk process, a slurry process or a bulk slurry process, for example.

As stated previously, hydrogen may be added to the process for a variety of reasons. For example, hydrogen may be added to increase the melt flow of the resultant polymer or to increase the catalyst activity. In an embodiment, hydrogen may be present in the reaction mixture in order to modify the molecular weight of the polymer product. In such embodiments, hydrogen may be present in the reaction mixture in an amount of from 0 to 200 ppm, alternatively from 10 ppm to 100 ppm, alternatively from 20 ppm to 60 ppm.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. The loop reactor may be maintained at a pressure of from 27 bar to 45 bar and a temperature of from 38° C. to 121° C., for example. Reaction heat may be removed through the loop wall via any method known to one skilled in the art, such as via a double-jacketed pipe.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

In an embodiment, the FMCs and catalyst systems comprising the FMCs disclosed are employed in the production of stereoregular polymeric compositions having a desired combination of physical properties such as molecular weight, melting temperature, and tacticity. In an embodiment, the FMCs and catalyst systems comprising an FMC of this disclosure are used in the production of isotactic-atactic polypropylene (IAP). LAP refers to polypropylene having the microstructure shown below where blocks of the polymer have the pendant methyl groups arranged on the same side of the polymer backbone while another block of the polymer has a random arrangement of the pendant methyl groups on the polymer backbone.

In an embodiment, the IAP may have a molecular weight of from 100,000 Daltons to 2,000,000 Daltons, alternatively from 200,000 Daltons to 1,000,000 Daltons alternatively from 400,000 Daltons to 800,000 Daltons. In an embodiment the IAP may have a melting temperature of from 120° C. to 165° C., alternatively from 130° C. to 165° C., alternatively from 120° C. to 145° C.

In an embodiment, the IAP produced by the catalysts of this disclosure may exhibit a tacticity ranging from 20% to 95% mmmm by weight of the polymer, alternatively from 40% to 90% mmmm, alternatively from 50% to 85% mmmm. The tacticity of the polymer produced by the methodologies disclosed herein may be varied by variations in the propylene concentration. In an embodiment, polymerization of propylene when carried out in bulk propylene may result in polypropylene having a tacticity ranging from 40% to 60% mmmm and a crystallinity ranging from 10% to 20% which is reduced when compared to polymerization reactions carried out at lower propylene concentrations. Herein the percent crystallinity may be calculated based on the heat of fusion using the following equation: % crystallinity=100×measured heat of fusion/209 J/g where the heat of fusion is measured by differential scanning calorimetry.

The effect of the propylene concentration on the tacticity and crystallinity of polypropylene may be due to the specific features of a catalyst structure having three asymmetric centers. Without wishing to be limited by theory, unsymmetrical catalysts and catalysts with multiple asymmetric centers may have several different coordination sites with different selectivities. The selectivity of these catalysts may depend on propylene concentration and increase with decreasing monomer concentration as described in an article by Rieger et al entitled "Unsymmetric ansa-Zirconocene Complexes with Chiral Ethylene Bridges: Influence of Bridge Conformation and Monomer Concentration on the Stereoselectivity of the Propylene Polymerization Reaction" published in 1994 in Organometallics, Volume 13, pages 647-653, which is incorporated herein by reference in its entirety. This effect can be explained by using the insertion process, Scheme 1 below.

The isospecific insertion of propylene in complex A results in complex B. In the case of the highly symmetric zirconium catalyst, the "backskip" reaction generates the complex B', which may then be involved in the stereospecific insertion of propylene to produce complex C'. The pathway proceeding through complex B' and C' results in the formation of isotactic polypropylene.

For unsymmetrical catalysts there is an increased probability of having a specific insertion of the monomer in complex B, leading to a stereoerror in the chain. This stereoerror results in the formation of hemi-isotactic or atactic polypropylene. Hemi-isotactic polypropylene is characterized by blocks of the polymer structure having every other methyl group on the same side of the polymer with the remaining methyl groups randomly being on the same side or on the opposite side of the polymer backbone. The transformation of state B with an asymmetric structure is dependent on the monomer concentration such that at high propylene concentration the chain migration (state B to state B', "backskip") is too slow to overcompensate the high population of state B. Therefore, at high propylene concentrations, an increase in the rate of stereoerror occurs resulting in a decrease in the stereoregularity of polypropylene. Furthermore, the tacticity and crystallinity of the polymer is expected to increase with increasing the polymerization temperature.

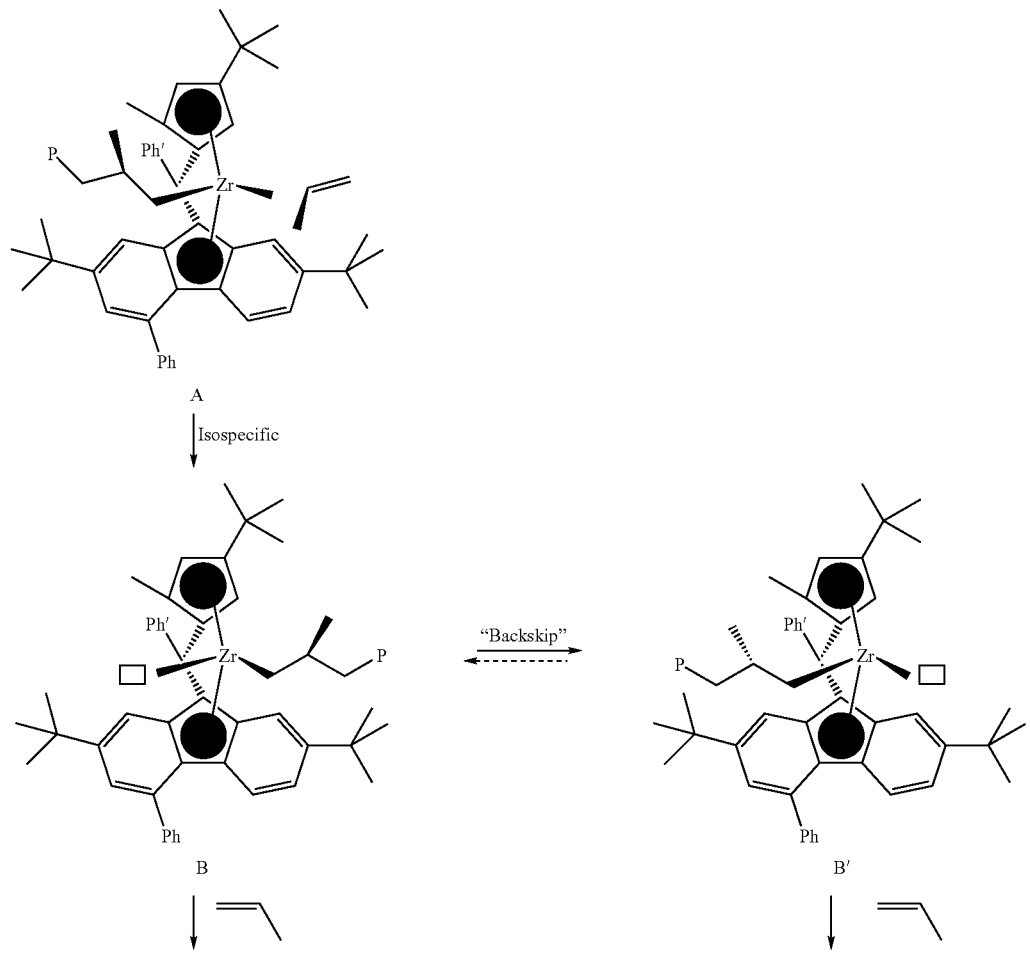

Scheme 1

-continued

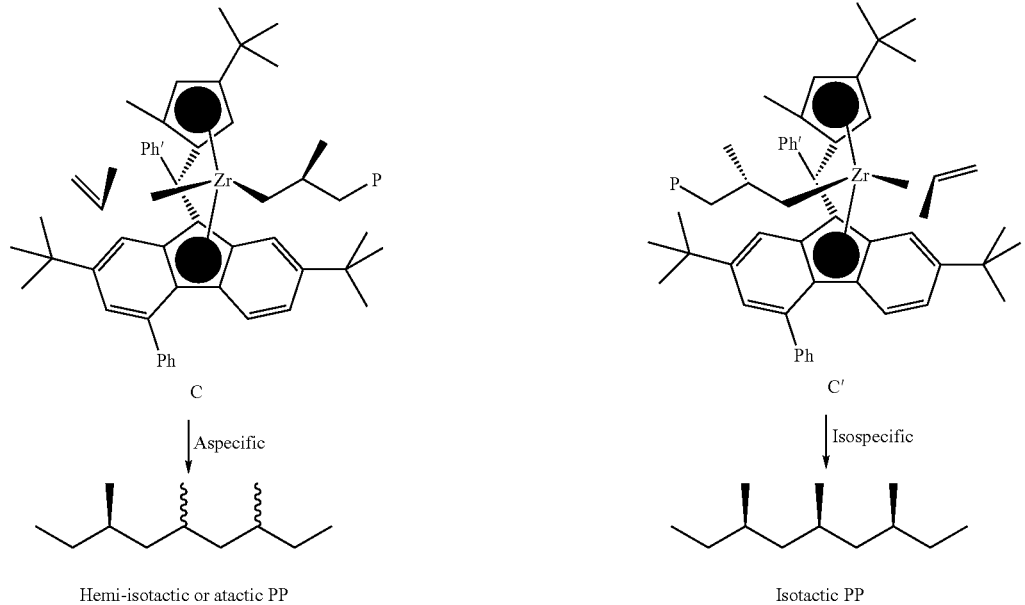

Hemi-isotactic or atactic PP

Isotactic PP

An IAP produced by the methodologies disclosed herein may display improved mechanical properties, strength, flexibility, and thermal properties. In an embodiment, the IAP may exhibit a tensile strength of from 1,000 psi to 6,000 psi, alternatively of from 2,000 psi to 6,000 psi, as determined in accordance with ASTM E2092. The tensile strength refers to the maximum tensile stress a material is capable of carrying. In an embodiment, the IAP may exhibit a tensile modulus of from 20,000 psi to 500,000 psi, alternatively from 40,000 psi to 300,000 psi as determined in accordance with ASTM E2092. The tensile modulus is the ratio of stress to elastic strain in tension. A high tensile modulus means that the material is rigid or more stress is required to produce a given amount of strain. In an embodiment, the IAP may exhibit a tensile strength at yield of from 1,000 psi to 7,000 psi, alternatively of from 2,000 psi to 6,000 psi as determined in accordance with ASTM E2092. The tensile strength at yield refers to the tensile stress where an increase in expansion is admitted without an increase in gaining the weight on stress-strain curve. In an embodiment, the IAP may exhibit a tensile strength at break of from 1,000 psi to 5,000 psi, alternatively of from 1,000 psi to 3,500 psi as determined in accordance with ASTM E2092. The tensile strength at break refers to the tensile stress at the moment the material is destroyed. In an embodiment, the IAP may exhibit an elongation at yield of less than about 10%. The elongation at yield refers to the elongation which corresponds to the tensile yield strength. In an embodiment, the LAP may exhibit an elongation at break of from 30% to 600%, alternatively of from 50% to 500%, as determined in accordance with ASTM E2092. The elongation at break refers to the elongation which corresponds to the tensile breaking strength.

The IAP of this disclosure may be further characterized by a complex modulus of from 800 MPsi to 1 MPsi in a temperature range of from 25° C. to 160° C. The dynamic complex modulus is a measure of the dynamic mechanical properties of a material, taking into account energy dissipated as heat during deformation and recovery. It is equal to the sum of static modulus of a material and its loss modulus.

The polymeric compositions produced using the catalysts or catalyst systems of this disclosure may be useful in applications known to one skilled in the art, such as forming operations for example film, sheet, pipe, fiber extrusion and co-extrusion as well as blow molding, injection molding and rotary molding. Films formed from these compositions may include blown or cast films formed by co-extrusion or by lamination which may be useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers that may be manufactured using the polymeric compositions produced by the catalysts and methodologies of this disclosure include for example and without limitation melt spinning, solution spinning and melt blown fiber operations for use in woven or non-woven form to make filters, diaper fabrics, medical garments and geotextiles. Extruded articles include medical tubing, wire and cable coatings, geomembranes and pond liners, for example. Molded articles include single and multi-layered constructions in the form of bottles, tanks, large hollow articles, rigid food containers and toys, for example. Other end-use articles that may be manufactured using the polymeric compositions produced by the catalysts and methodologies of this disclosure would be apparent to one of ordinary skill in the art.

EXAMPLES

The embodiments having been generally described, the following examples are given as particular embodiments of the disclosure and to demonstrate the practice and advantages thereof. It is understood that the examples are given by way of illustration and are not intended to limit the specification of the claims in any manner.

Example 1

The FMC (4-tert-Butyl-phenyl)[(5-methyl-3-tert-butyl-cyclopentadienyl)(4-phenyl-2,7-di-tert-butyl-fluorenyl)]methane zirconium dichloride was synthesized. The synthesis involved four steps, first the fulvene, 6-(4-tert-butyl-Phenyl)-5-methyl-3-tert-butyl-fulvene, was prepared by the reaction of methyl-tert-butyl-cyclopentadiene with 1-naphthaldehyde in the presence of sodium methoxide as depicted in Scheme 2. Specifically, to a solution of methyl-tert-butyl-cyclopentadiene (4.42 g, 32.5 mmol) and 4-t-butyl-benzaldehyde (5.15 g) in absolute ethanol (30 ml) was added a small portions of sodium methoxide (4.0 g) under stirring and the mixture was stirred for 2 h. The reaction was quenched with water and extracted with ether. The ether solution was evaporated under vacuum to give an orange liquid, which was purified by column chromatography (silica gel, hexane/$CH_2Cl_2$=8/1) (Yield 7.0 g). The sample was analyzed by $^1$H NMR in $CDCl_3$ and exhibited the following chemical shifts: δ 7.55 (m, 2H, Ph), 7.48 (m, 2H, Ph), 7.02 (s, 1H, H—CPh), (m, 1H, H-6), 6.27 and 6.22 (br s, 2H, H-Cp), 2.18 (s, 3H, Me), 1.39 and 1.23 (s, 9H, t-Bu).

4-Bromo-2,7-di-t-butylfluorene was then synthesized according to Scheme 3. Specifically, to a mixture of 2,7-di-t-butylfluorene (5.95 g, 21.4 mmol) and catalytic amount of iron powder in $CCl_4$ (40 ml) was added a solution of bromine (3.9 g, 24.3 mmol) in $CCl_4$ (10 ml) at 0° C. The reaction mixture was stirred for more than 3 h at room temperature and then was quenched with water. The mixture was extracted with ether, and the ether solution was washed with 10% NaOH solution, dried over $MgSO_4$, and evaporated under vacuum to afford the residue which was recrystallized from hot ethanol to give 4-bromo-2,7-di-t-butylfluorene (6.7 g, 87.6%). $^1$H NMR ($CDCl_3$): δ 8.44 (d, 1H, J=8.4, H5), 7.6-7.4 (m, 4H, H1, H3, H6 and H8), 3.89 (s, 2H, H9), 1.38, 1.36 (each s, 9H, t-Bu).

4-Phenyl-2,7-di-t-butylfluorene was then synthesized according to Scheme 4. Specifically, to a mixture of 4-bromo-2,7-di-t-butylfluorene (3.10 g, 8.68 mmol) and $Pd(PPh_3)_4$ (700 mg) in toluene (100 ml) was added to a solution of phenylboronic acid (1.59 g) in EtOH (20 ml) and a solution of $Na_2CO_3$ (2.9 g) in water (15 ml). The reaction mixture was stirred for 3 h under reflux. The reaction mixture was quenched with water, extracted with ether, dried over $MgSO_4$, and evaporated under vacuum to afford the residue which was purified by column chromatography (silica gel, hexane) to give 4-phenyl-2,7-di-t-butylfluorene (2.50 g, 81%). The sample was analyzed by $^1$H NMR and exhibited the following chemical shifts in $CD_2Cl_2$: δ 7.60, 7.57 and 7.24 (d or br s, H1, H3, and H8), 7.48 (m, 5H, Ph), 7.03 (dd, 1H, J=8.1 Hz, J=1.5 Hz, H6), 6.86 (d, 1H, J=8.1 Hz, H5), 3.93 (s, 2H, H9), 1.41 and 1.33 (each s, 9H, t-Bu).

The ligand, (4-tert-butylphenyl)[(3-Butyl-5-methyl-cyclopentadienyl)(4-Phenyl-2,7-di-tert-butyl-fluorenyl)]methane, was synthesized by reaction of lithium salt of 4-phenyl-2,7-di-t-butyl-fluorene with 6-(4-tert-butylphenyl)-3-tert-butyl-5-methyl-fulvene in ether solution as shown in Scheme 4. Specifically, butyllithium (1.4 ml, 1.6M in hexane, 2.24 mmol) was added to 4-phenyl-2,7-di-tert-butyl-fluorenyl (0.73 g, 2.06 mmol) in ether (20 ml) at −78° C. The reaction mixture was allowed to warm to room temperature and stirred for 3 h. 6-(4-tert-butyl-Phenyl)-5-methyl-3-tert-butyl-fulvene (0.58 g, 2.07 mmol) in ether (5 ml) was added to the reaction mixture at −40° C. The reaction was stirred at room temperature for 1.5 h. The reaction mixture was quenched with water, extracted with ether, dried over $MgSO_4$, and evaporated under vacuum to afford the desired ligand, which was washed with hot ethanol.

Finally, double deprotonation of the ligand with 2 equivalents of n-butyllithium in ether and subsequent reaction of the dilithium salt with $ZrCl_4$ in toluene afforded the corresponding dichloro Cp-Flu complex as shown in Scheme 5. Specifically, butyllithium (0.7 ml, 1.6M, 1.12 mmol) was added to (4-tert-butyl-phenyl)[(5-methyl-3-tert-butyl-cyclopentadienyl)(4-phenyl-2,7-di-tert-butyl-fluorenyl)]methane (0.33 g, 0.52 mmol) in ether (15 ml) at −78° C. The reaction mixture was allowed to heat to room temperature and the reaction was continued for 2.5 h. The solvent was removed under vacuum. $ZrCl_4$ (121 mg, 0.52 mmol) was added to the reaction mixture. Toluene (10 ml) was added at −40° C. and the reaction was stirred at room temperature for 1 day. The solvent was removed under vacuum.

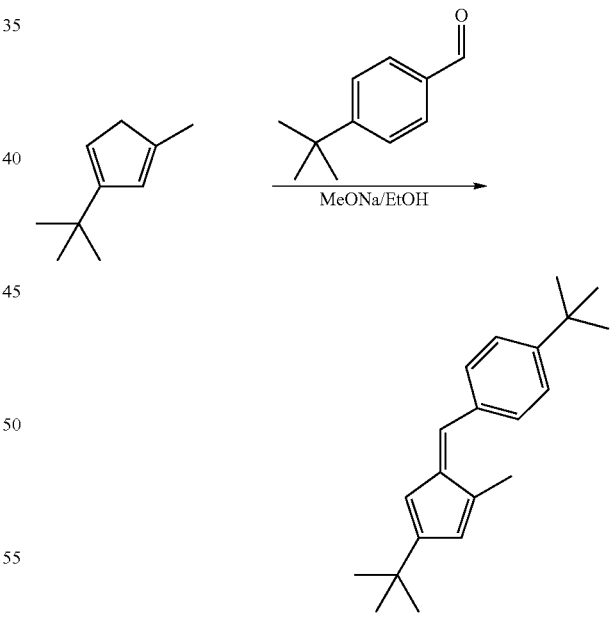

Scheme 2

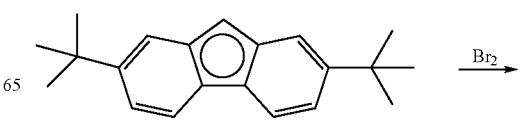

Scheme 3

-continued

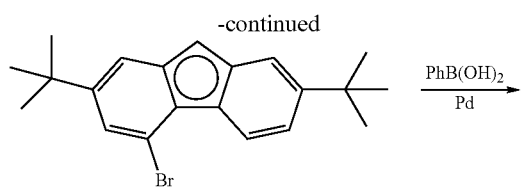

Scheme 4

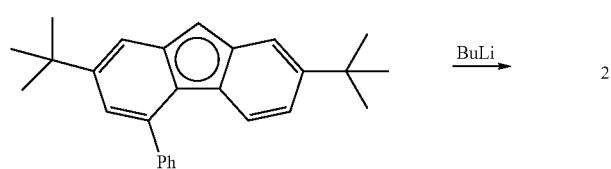

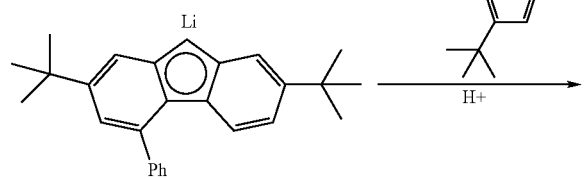

+ isomers

Scheme 5

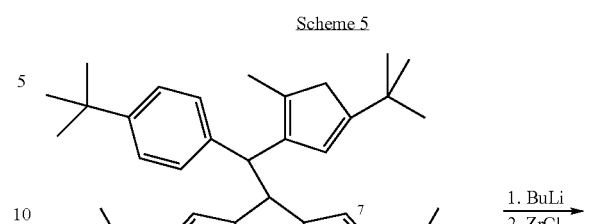

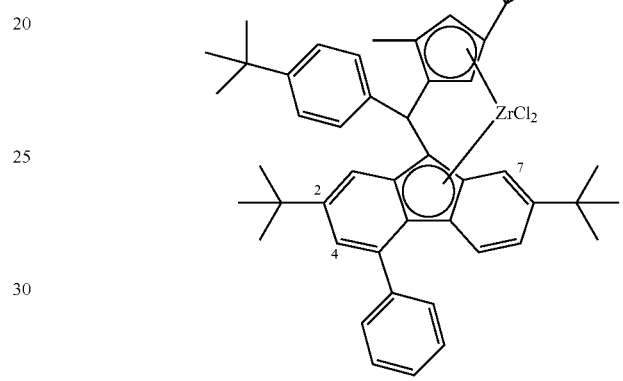

Example 2

The catalyst (4-tert-Butyl-phenyl)[(5-methyl-3-tert-butyl-cyclopentadienyl)(4-phenyl-2,7-di-tert-butyl-fluorenyl)]methane zirconium dichloride hereafter referred to as VM435-3 was synthesized according to conditions given in Example 1 and was used as a catalyst in the polymerization of propylene. The polymerization activities of this FMC which comprises three asymmetric centers are compared to that of another FMC catalyst AR35 which has a dimethyl bridging group, an unsubstituted fluorenyl group and only one asymmetric center, located on the Cp group, as shown in Structure X.

Structure X
Comparison

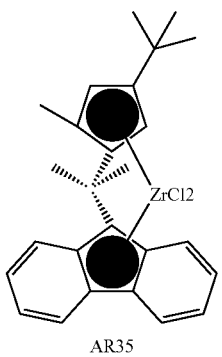

AR35

Homogeneous polymerization was conducted in toluene in a 10X Multi-Clave reactor at 60° C. using 120 psi propylene and either the VM435-3 or the AR35 catalyst without purification. The results in terms of polymerization parameters and polymer properties are given in Table 1.

TABLE 1

| # | Catalyst (mg) | Tmelt, ° C. | Tcryst, ° C. | Mn | Mw | Mz | Mw/Mn |
|---|---|---|---|---|---|---|---|
| 1 | VM435-3 | 148.9 | 105.1 | 23,759 | 97,138 | 266,415 | 4.1 |
| 2 | VM435-3 | 151.7/143.0 | 106.8 | 15,000 | 50,283 | 124,225 | 3.4 |
| 3 | VM435-3 | 150.2/142.7 | 105.8 | 15,768 | 63,221 | 190,550 | 4.0 |
| 4 | AR35 (Comparison) | 138.5 | 104.6 | 10,634 | 26,487 | 52,307 | 2.5 |

The enthalpies of melting and crystallization of the polypropylene samples produced were determined and are compared in Table 2.

TABLE 2

|  | # | | | |
|---|---|---|---|---|
|  | 1 | 2 | 3 | 4 |
| Recrystallization Peak | 105.1 | 106.8 | 105.8 | 104.6 |
| Delta H_Recrystallization | −35.9 | −40.0 | −42.9 | −51.8 |
| Second Melt Peak | 148.9 | 151.7 | 150.2 | 138.5 |
| Delta H_Second Melt | 23.5 | 21.8 | 33.8 | 30.2 |

The results demonstrate the VM435-3 catalyst produces polypropylene having an increased molecular weight when compared to the polypropylene prepared using the AR35 catalyst.

Example 3

The effect of propylene concentration on the tacticity of the polymer produced using the VM435-3 catalyst was determined. Homogeneous polymerization was conducted in bulk propylene in 10X Multi-Clave reactor using VM435-3 and AR35 catalysts without purification. The reactions were run for 30 minutes in the absence of hydrogen using 15 minutes to set up the reaction temperature. The polymerization was carried out at in the temperature range of 50-60° C. and the results are given in Table 3.

TABLE 3

| # | Catalyst (mg) | T, ° C. | Polymer, g | Activity, g/g/cat/h | Tmelt, ° C. | Mw/10³ | D | D' |
|---|---|---|---|---|---|---|---|---|
| 5 | VM435-3 1.0 | 60 | 2.0 | 4,000 | n.p. | 345 | 4.6 | 2.2 |
| 6 | VM435-3 (1.5 mg) | 40-50 | 1.9 | 1,670 | n.p. | 636.0 | 5.7 | 2.2 |
| 7 | VM435-3 (1.5 mg) | 20 | 0.6 | 400 | n.p. | 800.0 | 11.7 | 2.3 |
| 8 | AR35, 0.05 (Comparison) | 60 | — | — | 148.7 | 370.1 | 5.1 | 2.7 |

The tacticity of the polypropylene samples produced with the AR35 catalyst, Sample 8, and with the VM435-3 catalyst in bulk propylene, Samples 6 and 7, or at 120 psi propylene in Samples 2 and 3 (under conditions given in Example 2) were determined and are compared in Table 4.

TABLE 4

|  | # | | | | |
|---|---|---|---|---|---|
|  | 8 Bulk, 60 | 6 Bulk, 40-50 | 7 Bulk, 20 | 2 Tol, 60 | 3 Tol, 60 |
| mmmm | 62.0 | 43.5 | 40.0 | 76.7 | 76.7 |
| mmmr | 10.2 | 14.1 | 11.2 | 7.3 | 7.4 |
| rmmr | 1.2 | 1.9 | 3.0 | 0.4 | 0.4 |
| mmrr | 11.9 | 15.3 | 15.9 | 8.2 | 7.8 |
| xmrx | 3.1 | 4.8 | 3.6 | 1.6 | 1.6 |
| mmrr | 0.0 | 0 | 0 | 0.3 | 0.4 |
| rrrr | 3.0 | 7.4 | 12.8 | 0.7 | 0.7 |
| rrrm | 3.1 | 5.9 | 7.3 | 1.0 | 1.0 |
| mrrm | 5.5 | 7.1 | 6.2 | 3.8 | 3.9 |
| % meso | 80.9 | 69.5 | 64.0 | 89.5 | 89.4 |
| % racemic | 19.1 | 30.5 | 36.0 | 10.5 | 10.6 |
| % error | 2.7 | 4.3 | 4.9 | 1.2 | 1.2 |
| def/1000 C. | 13.6 | 152.6 | 180.0 | — | — |

The results demonstrate an increased activity with increasing temperature for the VM 435-3 catalyst. At lower propylene concentrations, for example when using a toluene/propylene mixture, the resultant polypropylene has an increased tacticity, approximately 77% when compared to a tacticity of approximately 42% when the polymerization reaction is carried out in bulk propylene.

Example 4

Propylene polymerization with the VM435-3 catalyst was conducted at 60° C. using a 2 L bench reactor in the presence of hydrogen. The polymerization was carried out in either bulk propylene or a propylene/toluene mixture as indicated in Table 5.

TABLE 5

| # | Catalyst (mg) | Condition | H$_2$, ppm | T, °C. | Polymer, g | Activity, g/g/cat/h | Tm, °C. | Mw/10$^3$ | D | D' | % XS | XS MW/1000 | Tacticity, % mmmm |
|---|---|---|---|---|---|---|---|---|---|---|---|---|---|
| 9 | 0.9 | Bulk | 20 | 50 | 14 | 31,1000 | 157.0 | 662.6 | 4.8 | 2.3 | 26.9 | 480.7 | 66.0 |
| 10 | 3 | Bulk | 30 | 60 | 55 | 36,666 | 153.0 | 337.0 | 3.1 | 2.1 | 41.0 | — | 69.1 |
| 11 | — | — | — | — | — | — | — | — | — | — | — | — | 90.4 |
| 12 | 2.0 | Bulk/Tol = 5/1 | 20 | 50 | 56 | 56,000 | 165.0 | 770.5 | 4.9 | 2.4 | 34.5 | 474.4 | 68.0 |
| 13 | 1.5 | Bulk/Tol = 5/1 | 20 | 55-60 | 27 | 36,000 | 155.0 | 764.5 | 5.6 | 2.5 | 13.5 | 416.7 | 76.4 |
| 14 | 1.5 | Bulk/Tol = 5/1 | 60 | 60-65 | 35 | 46,666 | 157.7 | 441.1 | 4.6 | 2.3 | 31.7 | 485.4 | 72.3 |
| 15 | 3 | Bulk/Tol = 5/1, 3 min | 60 (leak) | 60-70 | — | — | 158.0 | 1,068.4 | 4.6 | 2.3 | 3.9 | — | 81.8 |
| 16 | — | — | — | — | — | — | — | — | — | — | — | — | 93.0 |
| 17 | 1.5 | Bulk/Tol = 5/1 | 20 | 70 | 32 | 42,666 | 156.0 | 577.4 | 5.9 | | 12.9 | 414.5 | 81.3 |
| 18 | 1.5 | Bulk/Tol = 5/1 | 10 | 60 | 22 | 29,000 | 155.0 | 684.2 | 5.3 | 2.8 | — | — | 62.8 |
| 19 | 2 | Bulk/Tol = 5/1 | 10 | 60 | 35 | 35,000 | 157.0 | 874.2 | 5.5 | 2.8 | — | — | 72.8 |
| 20 | 2 | Bulk | 10 | 60 | 32 | 32,000 | 153.7 | 535.2 | 5.5 | 2.6 | — | — | 53.7 |

The enthalpies of melting and crystallization of the polypropylene samples produced were determined and are compared in Table 6, while the tacticity of the samples is given in Table 7.

TABLE 6

| | # | | | | | |
|---|---|---|---|---|---|---|
| | 9 | 10 | 11 | 12 | 13 | 14 |
| Recrystallization Peak | 122.3 | 89.3 | n.d. | 102.6 | 114.3 | 113.6 |
| Delta H_Recrystallization | −44.2 | −22.4 | — | −44.1 | −68.0 | −52.1 |
| Second Melt Peak | 157.0 | 153.0 | — | 165.0 | 155.0 | 157.7 |
| Delta H_Second Melt | 37.1 | 9.2 | — | 28.2 | 63.8 | 42.7 |

| | # | | | | | |
|---|---|---|---|---|---|---|
| | 15 | 16 | 17 | 18 | 19 | 20 |
| Recrystallization Peak | 117.3 | n.d. | 111.6 | 102.3 | 102.6 | 105.6 |
| Delta H_Recrystallization | −64.3 | — | −66.1 | −35.2 | −53.6 | −44.6 |
| Second Melt Peak | 158.0 | — | 156.0 | 155.0 | 157.0 | 153.7 |
| Delta H_Second Melt | 54.8 | — | 54.5 | 30.5 | 43.7 | 39.2 |

TABLE 7

| | # | | | | | |
|---|---|---|---|---|---|---|
| | 9 | 10 | 11 | 12 | 13 | 14 |
| mmmm | 66.0 | 69.1 | 90.4 | 68.0 | 76.4 | 72.3 |
| mmmr | 8.8 | 8.5 | 3.1 | 7.9 | 5.9 | 7.4 |
| rmmr | 1.0 | 0.7 | 0.0 | 0.8 | 0.5 | 0.6 |
| mmrr | 10.2 | 9.1 | 3.3 | 9.3 | 6.9 | 8.3 |
| xmrx | 2.8 | 2.5 | 0.5 | 2.8 | 2.0 | 2.2 |
| mmrr | 0.0 | 0.7 | 0.0 | 0.5 | 0.4 | 0.5 |
| rrrr | 3.6 | 2.4 | 0.5 | 3.4 | 2.6 | 2.3 |
| rrrm | 3.1 | 2.8 | 0.6 | 3.2 | 2.3 | 2.5 |
| mrrm | 4.5 | 4.3 | 1.7 | 4.2 | 3.1 | 3.9 |
| % meso | 82.3 | 84.4 | 95.4 | 83.0 | 87.4 | 85.7 |
| % racemic | 17.7 | 15.6 | 4.6 | 17.0 | 12.6 | 14.3 |
| % error | 2.4 | 1.9 | 0.2 | 2.2 | 1.5 | 1.7 |
| def/1000 C. | 88.6 | 78.1 | 23.0 | 85.1 | 63.0 | 71.3 |

TABLE 7-continued

| | # | | | | | |
|---|---|---|---|---|---|---|
| | 15 | 16 | 17 | 18 | 19 | 20 |
| mmmm | 81.8 | 93.0 | 81.3 | 62.8 | 72.8 | 53.7 |
| mmmr | 4.4 | 1.8 | 4.5 | 9.6 | 7.5 | 11.9 |
| rmmr | 0.5 | 0.1 | 0.4 | 1.0 | 0.5 | 1.2 |
| mmrr | 5.5 | 2.2 | 5.5 | 11.3 | 8.3 | 13.7 |
| xmrx | 1.4 | 0.5 | 1.5 | 2.9 | 2.1 | 4.2 |
| mmrr | 0.4 | 0.0 | 0.4 | 0.6 | 0.2 | 0.9 |
| rrrr | 1.9 | 0.6 | 2.4 | 3.2 | 2.3 | 3.5 |
| rrrm | 1.8 | 0.7 | 1.7 | 3.5 | 2.5 | 4.2 |
| mrrm | 2.4 | 0.9 | 2.4 | 5.2 | 3.7 | 6.7 |
| % meso | 90.2 | 96.4 | 89.9 | 80.8 | 86.1 | 76.2 |
| % racemic | 9.8 | 3.6 | 10.1 | 19.2 | 13.9 | 23.8 |
| % error | 1.2 | 0.4 | 1.2 | 2.5 | 1.5 | 3.3 |
| def/1000 C. | 48.8 | 18.1 | 50.5 | 96.2 | 69.4 | 119.2 |

Figure 2:
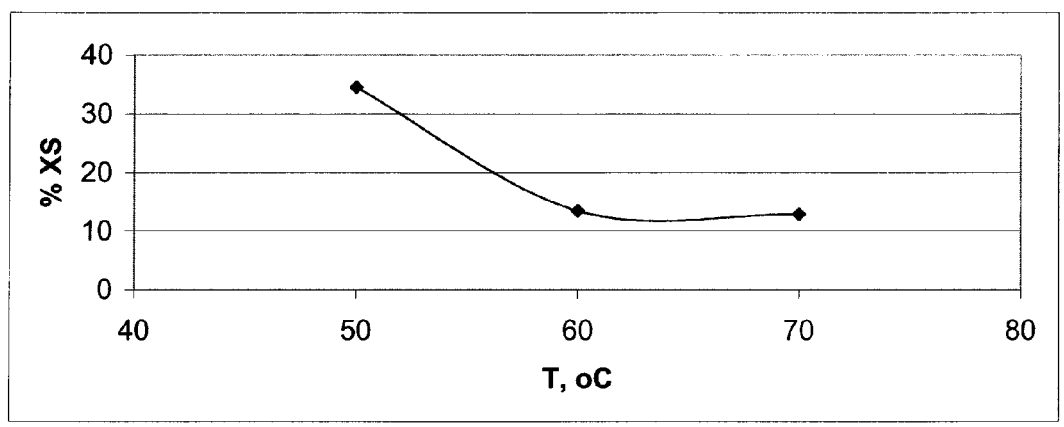
FIG. 2 is a plot of the reaction temperature versus the percent xylene solubles for polymers produced using the VM435-3 catalyst.
Figure 3:
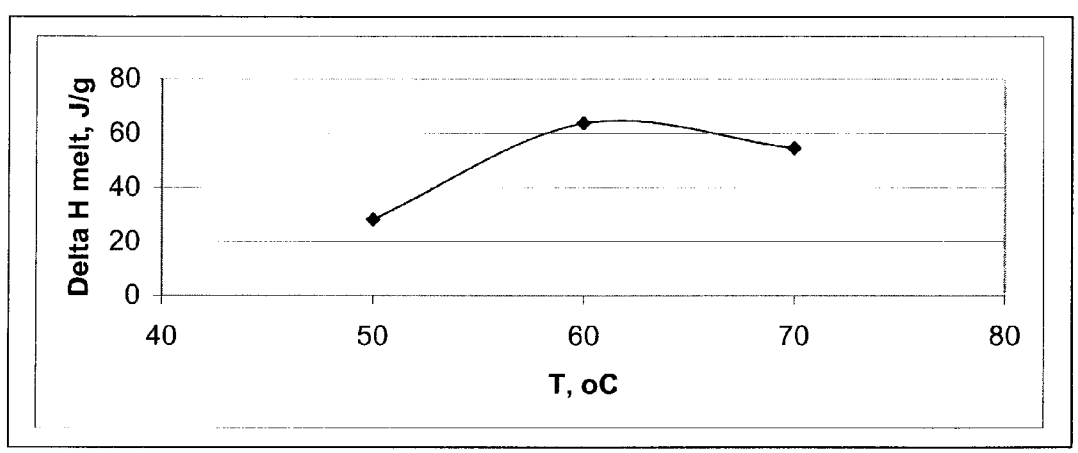
FIG. 3 is a plot of the reaction temperature versus melt enthalpy for polymers produced using the VM435-3 catalyst.
Figure 4:
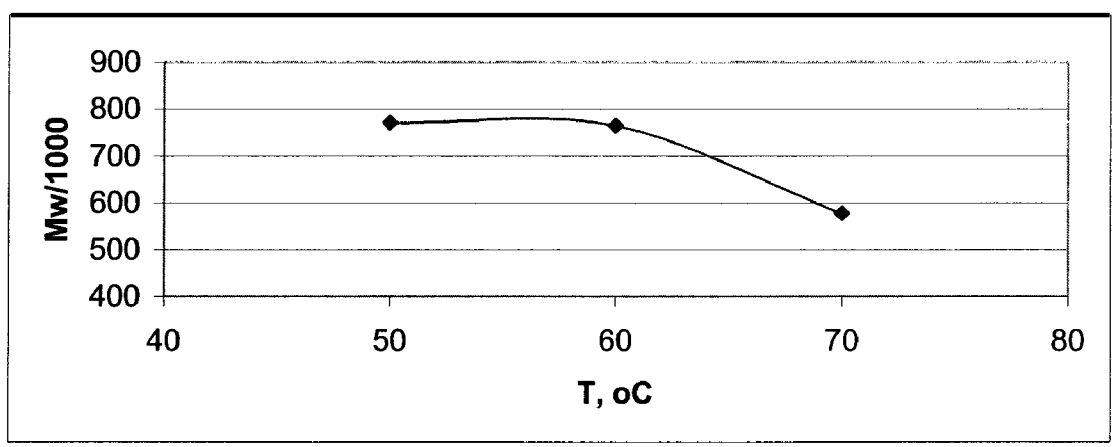
FIG. 4 is a plot of the reaction temperature versus molecular weight for polymers produced using the VM435-3 catalyst.
Figure 5:
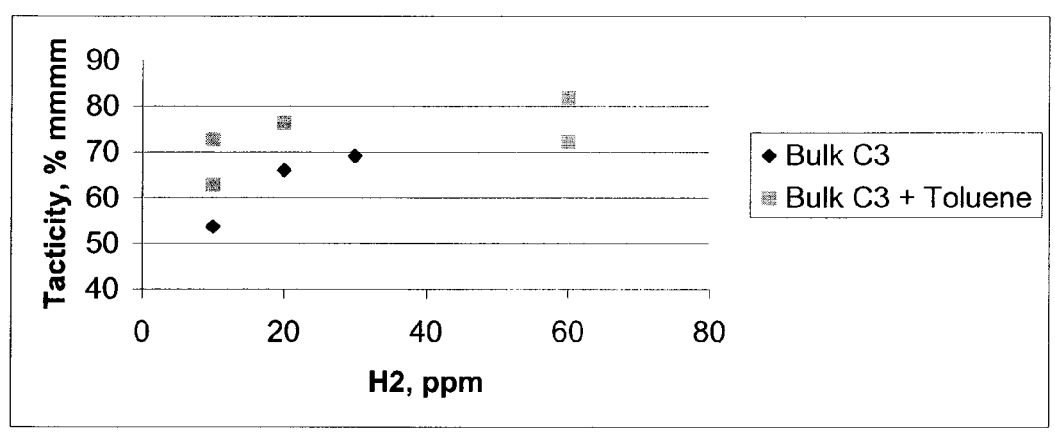
FIG. 5 is a plot of the hydrogen concentration versus tacticity for polymers produced using the VM435-3 catalyst.

The tacticity of the polymer sample is shown to increase with increasing polymerization temperature, FIG. 1. However, increasing the polymerization temperature reduces the percent xylene solubles (% XS) in the samples as seen in FIG. 2. The melting enthalpies are shown to increase and then level off over the polymerization reaction temperatures investigated as shown in FIG. 3 while the polymer molecular weight decreases steadily with increasing temperature as shown in FIG. 4. The addition of hydrogen results in an increased polymer molecular weight whether using bulk propylene or a propylene/toluene mixture as shown in FIG. 5.

Example 5

The effect of using catalysts supported on silica on the polymerization activity was determined. Specifically, the VM435-3 catalyst was supported on silica supports available from Asahi Glass Co., Ltd. under the designation G-952. G-952 silica with 2 wt % loading of the VM435-3 catalyst was tested in a 6-parallel reactor set. The reactions were carried out at 60° C. for 30 min in the presence of 60 ppm H$_2$ as indicated in Table 8 which also presents the results in terms of polymerization parameters and polymer.

TABLE 8

| # | Catalyst (mg) | H$_2$, ppm | Polymer, g | Activity, g/g/cat/h | Tm, °C. | Tc, °C. | Mw/1000 | Mw/Mn | Mz/Mw | mmmm, % |
|---|---|---|---|---|---|---|---|---|---|---|
| 21 | 30 | 60 | 1.7 | 113 | 150.4/141.9 | 102.3 | 128.9 | 4.4 | 2.5 | 82.5 |
| 22 | | | | | 155.0 | 113.0 | 164.7 | 2.6 | | 91.9 |

TABLE 8-continued

| # | Catalyst (mg) | H$_2$, ppm | Polymer, g | Activity, g/g/cat/h | Tm, °C. | Tc, °C. | Mw/1000 | Mw/Mn | Mz/Mw | mmmm, % |
|---|---|---|---|---|---|---|---|---|---|---|
| 23* | 30 | 60 | 1.2 | 80 | 137.0 | 94.6 | 188.2 | 4.3 | 2.5 | 4.0% of C2 |

*Copolymerization with 0.5 wt % of ethylene

The ethylene/propylene copolymerization with VM435-3 catalyst produced ethylene/propylene copolymers with a high ethylene content as shown in Table 9.

TABLE 9

| Sample Type | Whole |
|---|---|
| mole % E | 5.9 |
| mole % P | 94.1 |
| wt % E | 4.0 |
| wt % P | 96.0 |
| mole % PP | 91.1 |
| mole % PE | 6.0 |
| mole % EE | 3.0 |
| mole % PPP | 77.0 |
| mole % PPE | 10.0 |
| mole % EPE | 7.1 |
| mole % PEP | 2.1 |
| mole % PEE | 1.4 |
| mole % EEE | 2.3 |

EXAMPLES 6-7

Mechanical characterization of a polypropylene sample, Sample 10, produced using the VM435-3 was carried out. Specifically, dynamic mechanical analysis (DMA) was employed to give indications of solid state properties and other mechanical and rheological properties were also assessed. For DMA solid phase testing the test type employed a temperature sweep from 25° C. to 170° C., a rectangular torsion geometry, a temperature ramp rate of 5° C./min, a strain amplitude of 1% and a frequency of 1 rad/sec. DMA Melt Phase Testing was conducted using a test type of temperature—frequency sweep, a geometry using a 25 mm parallel plate W/1 mm gap at test temperatures of 245° C., 215° C., and 185° C., a strain amplitude of 35% and a frequency range of 0.1-316 rad/sec. Sample 10 is an isotactic-atactic polypropylene homopolymer based on the NMR tacticity data and has a very large amount of soluble content. Solid and melt phase DMA testing was employed in the characterization of the resin. FINAPLAS 1571 which is a syndiotactic polypropylene and POLYPYOPYLENE 3652, also referred to as TPI 3652, which is an isotactic polypropylene both of which are commercially available from TOTAL Petrochemicals were also tested for comparative purposes. Polymer properties of Sample 10 and the comparative resins used in Examples 6-7 are given in Table 10.

Example 6

Figure 6:
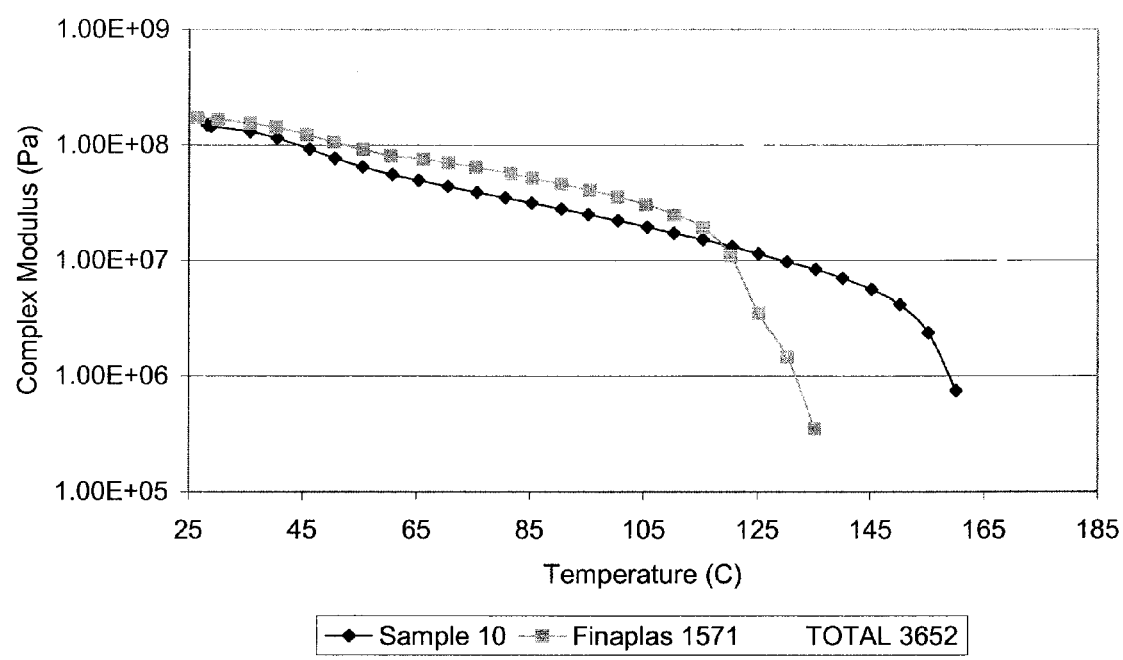
FIG. 6 is a plot of the complex modulus as a function of temperature for the resins of Example 6.

Plotted in FIG. 6 is the dynamic complex modulus data as a function of temperature for Sample 10 and the comparative resins. The magnitude of the modulus value at ambient temperature suggests that Sample 10 would exhibit similar tensile and flexural moduli as the syndiotactic resin, FINAPLAS 1571. Without wishing to be limited by theory this could be due to the high soluble fraction acting as a plasticizer. Furthermore, the 153° C. melting point enables Sample 10 to retain modulus strength at a higher temperature which is similar to the behavior of the iPP resin TPI 3652 and may also translate to heat deflection temperature (HDT) values approaching the iPP grade. The HDT may be determined in accordance with ASTM E2092 wherein a static load is applied to the center of a rectangular beam that is supported on each end (3-Point Bend type testing) and the beam is heated at a constant rate. The temperature at which the beam deflects 0.25 mm is called the heat deflection temperature.

Example 7

Figure 7:
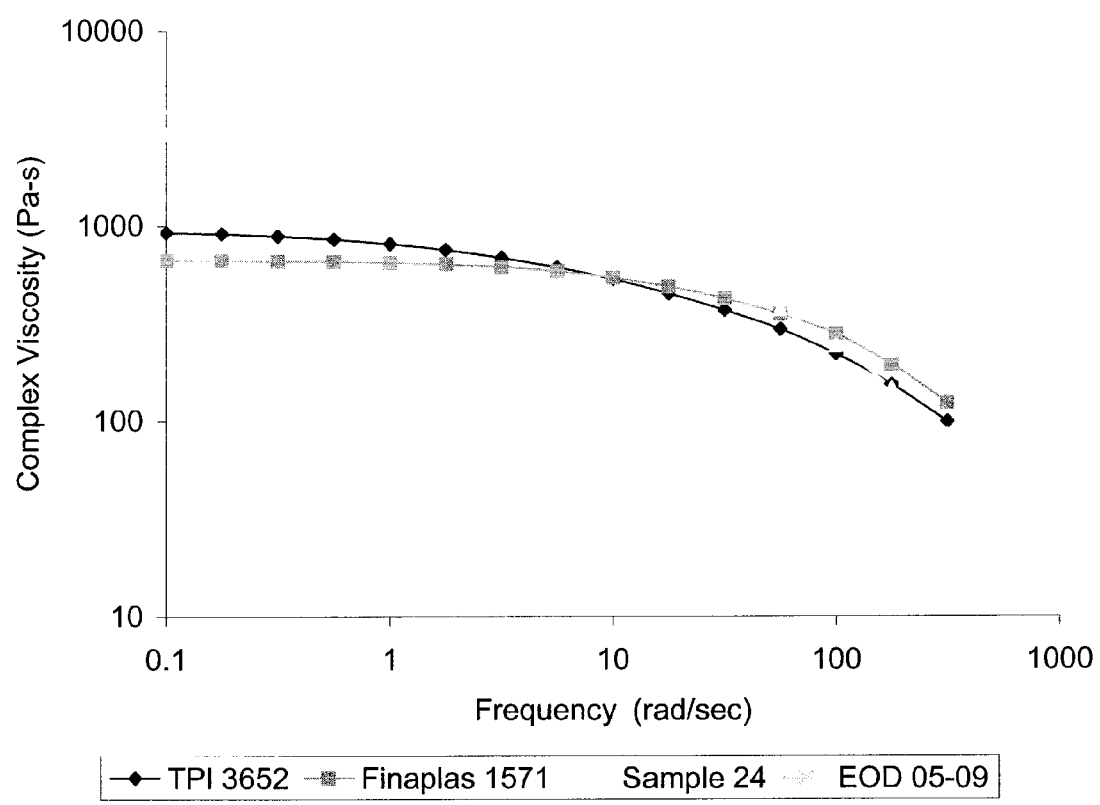
FIG. 7 is a plot of the complex viscosity as a function of frequency for the resins of Example 7.

Sample 10 and comparative resins FINAPLAS 1571 and TPI 3652 were subjected to DMA analysis in the melt phase. Analysis in the melt phase was comprised of shear response data at three temperatures. Time-temperature superposition (TTS) was utilized to generate a single shear response curve at 190° C. and the Carreau—Yasuda (CY) viscosity model was fit to the shear response curve yielding the CY parameters (zero shear viscosity, characteristic relaxation time, and breadth parameter) describing the curve. Listed in Table 11 are the CY parameters for the three resins investigated and plotted in FIG. 7 is the shear response curves at 190° C.

TABLE 11

| Sample ID | Zero Shear Viscosity (Pa-s) | Relaxation Time (sec) | Breadth Parameter | Activation Energy (KJ/mol) |
|---|---|---|---|---|
| TOTAL 3652 | 2571 | 0.0307 | 0.48 | 33.89 |
| FINAPLAS 1571 | 2119 | 0.0263 | 0.71 | 41.73 |
| Sample 10 | 9156 | 0.103 | 0.396 | 32.52 |

TABLE 10

| Sample ID | Melting Point (° C.) | NMR Data | | GPC Data | | | | XS % |
|---|---|---|---|---|---|---|---|---|
| | | % meso | % racemic | Mw | Mn | Mz | MWD | |
| 10 | 153 | 84.4 | 15.6 | 337000 | 107000 | 721000 | 3.1 | 41 |
| FINAPLAS 1571 | 129 | 7.1 | 92.9 | 148000 | 43000 | 362000 | 3.4 | 8 |
| TPI 3652 | 161 | 97.4 | 2.6 | 236000 | 36000 | 855000 | 6.5 | 2 |

Sample 10 appears to have a much broader MWD than the GPC MWD indicates based on its rheological shear thinning properties. The CY breadth parameter would suggest that it is similar to broad MWD resins such as an experimental grade resin EOD 05-09. Analysis of the EOD 05-09 yielded a breadth parameter of 0.394 and a MWD of 11.2. The shear response curve for the EOD 05-09 resin is plotted in FIG. 7 with the other resins. The shear thinning properties of Sample 10 is far superior to the broad composition EOD 05-09. Eventually, Sample 10 (69% mmmm, Mw=337,000) was found to possess stiffness properties similar to a syndiotactic resin and thermo-mechanical properties approaching isotactic grades. Additionally, the rheological shear thinning properties of Sample 10 is superior to existing broad composition resins like the EOD 05-09. Therefore, the new resin characteristic could be advantageous in application processes.

Example 8

Figure 8:
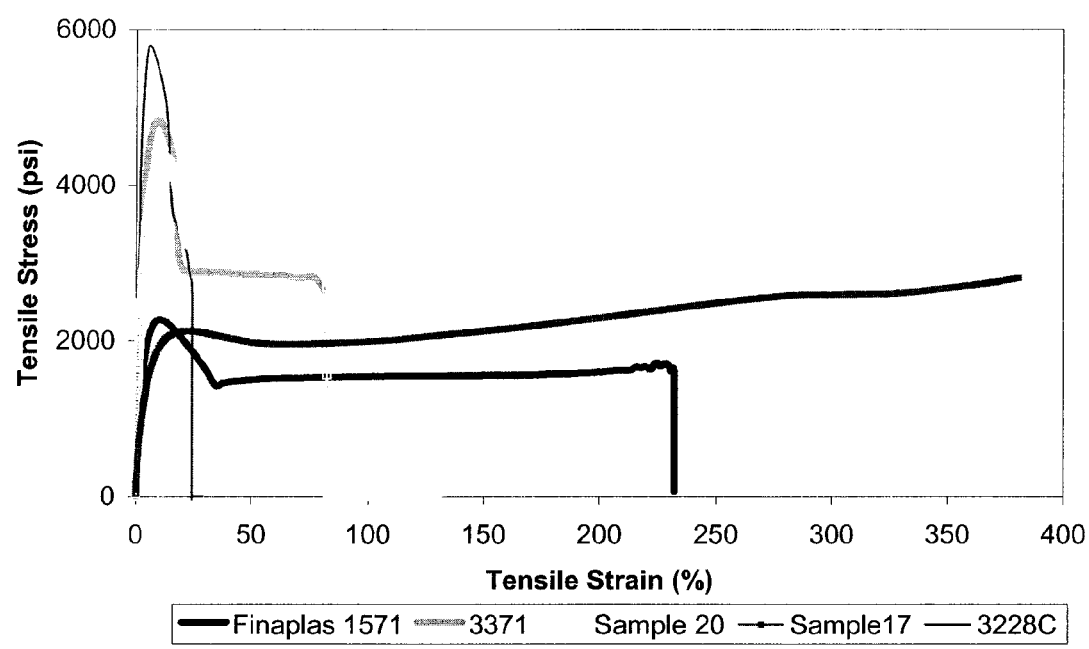
FIG. 8 is a plot of tensile stress as a function of tensile strain for the resins of Example 8.

Instron tensile properties were conducted on two polypropylene samples and compared to commercial grade syndiotactic and isotactic resins. Sample 17 (high tacticity) and Sample 20 (low tacticity) were produced with the VM435-3 catalyst system. Tensile property comparisons were made with FINAPLAS 1571 and POLYPROPYLENE 3371 also referred to herein as TPI 3371. POLYPROPYLENE 3371 is a film grade homopolymer commercially available from TOTAL Petrochemicals Inc. Sample preparation of tensile specimens was achieved utilizing the DSM molder. Specifically, research fluff samples were first compression molded into sheet that would be cut up for insertion into the DSM heating chamber. Compression molding was conducted at 190° C. with a pre-heat time of 3 minutes and a high compression time of 2 minutes. The DSM injection molder sample heating chamber was set at 230° C. and a mold temperature of 60° C. was utilized. Maximum injection pressure (6.5 bar) was used to inject the molten polymer into the mold cavity with a hold time 30 seconds. Analytical data is displayed in Table 12 and the tensile stress—strain curves are plotted in FIG. 8.

The results demonstrate that Sample 17 (81% mmmm, Mw=577,000), the high tacticity resin, acts very similar to the standard film grade TPI 3371 in the tensile test. The overall shape and basic tensile properties of Sample 17 are comparable to the TPI 3371 resin. Sample 20 (54% mmmm, Mw=535,000), the low tacticity resin, is comparable to the FINAPLAS 1571 resin with respect to tensile modulus and strength at yield, however the ductility of Sample 20 is far superior to the commercial syndiotactic grade.

While various embodiments have been shown and described, modifications thereof can be made by one skilled in the art without departing from the spirit and teachings of the disclosure. The embodiments described herein are exemplary only, and are not intended to be limiting. Many variations and modifications of the embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments disclosed herein. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:
1. A method of producing a polymer comprising:
  contacting in a reaction zone under conditions suitable for polymerization alpha-olefin monomer with a metal-

TABLE 12

| Analysis | Commercial sPP FINAPLAS 1571 | Research iPP (Low Tacticity) Sample 17 | Commercial iPP TPI 3371 | Research iPP (High Tacticity) Sample 20 |
| --- | --- | --- | --- | --- |
| Tensile Modulus (Kpsi) | 70 | 51 | 233 | 148 |
| Tensile Elongation @ Yield (%) | 10.7 | 22.4 | 8.7 | 11.6 |
| Tensile Strength @ Yield (psi) | 2146 | 2123 | 5034 | 4351 |
| Tensile Elongation @ Break (%) | 230 | 381 | 67 | 130 |
| Tensile Strength @ Break (psi) | 1553 | 2807 | 2860 | 3209 |
| NMR % meso | 7.1 | 76.2 | 97.8 | 89.9 |
| NMR % rasemic | 92.9 | 23.8 | 2.2 | 10.1 |
| X-Sol (%) | 8 | — | 4.3 | 12.9 |
| Mw | 148000 | 535189 | 451875 | 557438 |
| Mn | 43000 | 96460 | 55318 | 97222 |
| Mz | 362000 | 1367417 | 2424786 | 1384206 |
| MWD | 3.4 | 5.5 | 8.2 | 5.9 | locene catalyst having at least three asymmetric centers, wherein the metallocene has the formula:

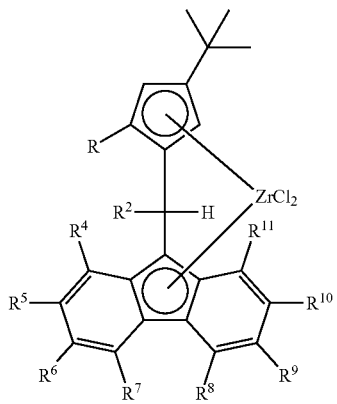

wherein R is H or Me; $R^2$ is a $C_1$-$C_{20}$ alkyl group or a $C_6$-$C_{30}$ aryl group and $R^4$-$R^{11}$ are each a hydrogen, $C_1$-$C_{20}$ alkyl group, a $C_6$-$C_{30}$ aryl group, and at least one of the following conditions is realized: $R^4$ is different from $R^{11}$, $R^5$ is different from $R^{10}$, $R^6$ is different from $R^9$, or $R^7$ is different from $R^8$; and recovering an alpha-olefin polymer from the reaction zone.

2. The method of claim 1 wherein the metallocene catalyst has the formula, including stereoisomers:

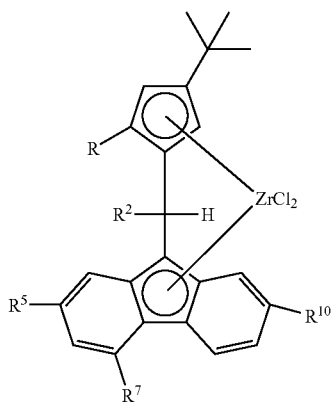

wherein R is H or Me; $R^2$, $R^5$, $R^7$, $R^{10}$ are each a $C_1$-$C_{20}$ alkyl group or a $C_6$-$C_{30}$ aryl group and $R^5$ and $R^{10}$ are the same or different.

3. The method of claim 2 wherein the metallocene catalyst has the formula, including stereoisomers

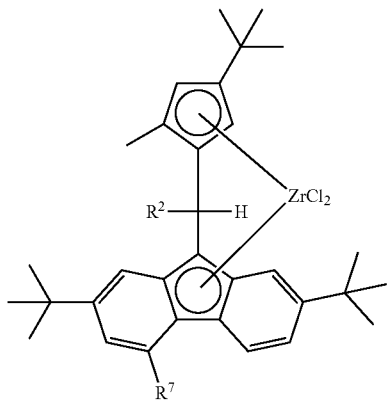

wherein $R^2$ and $R^7$ are each a $C_6$-$C_{30}$ aryl group.

4. The method of claim 3 wherein the metallocene catalyst has the formula, including stereoisomers:

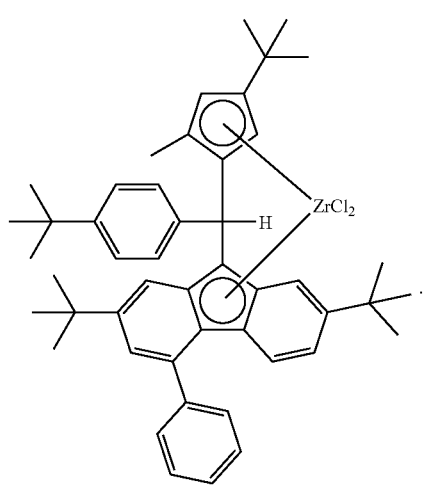

5. The method of claim 1 wherein the alpha-olefin monomer comprises propylene and the alpha-olefin polymer comprises polypropylene.

6. The method of claim 1 wherein the alpha-olefin monomer comprises propylene and another alpha-olefin and the polymer comprises copolymer of propylyene with alpha-olefin.

7. The method of claim 5 wherein the polypropylene has mmmm isotacticity of from 20% to 95% by weight of the polymer.

8. The method of claim 7 wherein the tacticty of polypropylene varies as a function of propylene concentration.

9. The method of claim 5 wherein the polypropylene has a weight average molecular weight of from 100,000 to 2,000,000 Daltons.

10. The method of claim 5 wherein the polypropylene has a melting point of from 130° C. to 165° C.

11. The method of claim 5 wherein the polypropylene has a complex modulus of from 1 MPsi to 800 MPsi in a temperature range of from 25° C. to 160° C.

12. The method of claim 1 wherein the contacting step further comprises contacting a co-catalyst in the reaction zone under conditions suitable for polymerization of the alpha-olefin monomer with the metallocene catalyst having at least three asymmetric centers.

13. The method of claim 12 wherein the co-catalyst comprises methylalumoxane, triethylaluminum, tri-isobutylaluminum, tris-pentafluorophenyl boron or combinations thereof.

14. The method of claim 1 wherein the metallocene catalyst is supported.

15. The method of claim 1 wherein the reaction zone has a temperature of from −30° C. to 120° C.

16. The method of claim 1 wherein the contacting step further comprises adding hydrogen in the reaction zone under conditions suitable for polymerization of the alpha-olefin monomer with the metallocene catalyst having at least three asymmetric centers.

17. The method of claim 16 wherein the hydrogen is present in an amount of from 0.1 to 200 ppm.

* * * * *